United States Patent
Nakagawa et al.

(10) Patent No.: US 9,030,714 B2
(45) Date of Patent: May 12, 2015

(54) IMAGE PROCESSING APPARATUS AND IMAGE PROCESSING METHOD TO SET APPROPRIATE INK AMOUNT FOR CHARACTER DATA AND FOR IMAGE DATA

(71) Applicant: Canon Kabushiki Kaisha, Tokyo (JP)

(72) Inventors: Junichi Nakagawa, Tokyo (JP); Akitoshi Yamada, Yokohama (JP); Mitsuhiro Ono, Tokyo (JP); Ryosuke Iguchi, Kawasaki (JP); Hitoshi Nishikori, Inagi (JP); Norihiro Kawatoko, Yokohama (JP); Fumiko Suzuki, Kawasaki (JP); Atsuhiko Masuyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 13/835,144

(22) Filed: Mar. 15, 2013

(65) Prior Publication Data
US 2013/0250364 A1    Sep. 26, 2013

(30) Foreign Application Priority Data
Mar. 22, 2012  (JP) ................. 2012-065665

(51) Int. Cl.
*G06K 15/00* (2006.01)
*B41J 2/21* (2006.01)
*H04N 1/40* (2006.01)

(52) U.S. Cl.
CPC ........... *B41J 2/2132* (2013.01); *H04N 1/40087* (2013.01)

(58) Field of Classification Search
None
See application file for complete search history.

(56) References Cited

U.S. PATENT DOCUMENTS

| | | | | |
|---|---|---|---|---|
| 5,892,852 A * | 4/1999 | Namizuka et al. | ............ | 382/254 |
| 6,018,399 A * | 1/2000 | Yamada et al. | ................ | 358/1.9 |
| 6,351,320 B1 * | 2/2002 | Shin | ................ | 358/1.9 |
| 7,038,812 B2 * | 5/2006 | Hashimoto et al. | ............ | 358/1.9 |
| 7,203,434 B2 * | 4/2007 | Nakayama | ..................... | 399/49 |
| 7,986,447 B2 * | 7/2011 | Bang et al. | ..................... | 358/518 |
| 8,064,095 B2 * | 11/2011 | Maki | .............................. | 358/1.2 |
| 8,111,427 B2 * | 2/2012 | Konji et al. | .................... | 358/2.1 |
| 8,310,743 B2 * | 11/2012 | Yasunaga et al. | ............ | 358/518 |
| 8,384,964 B2 * | 2/2013 | Sakaue et al. | ................ | 358/3.27 |
| 8,494,266 B2 * | 7/2013 | Yamada et al. | ................ | 382/170 |
| 2006/0215227 A1 * | 9/2006 | Kakutani | .................... | 358/3.01 |
| 2007/0019258 A1 * | 1/2007 | Hattori | ......................... | 358/518 |
| 2007/0058201 A1 * | 3/2007 | Ike et al. | ...................... | 358/3.06 |
| 2009/0002739 A1 | 1/2009 | Lapstun | | |
| 2010/0290067 A1 * | 11/2010 | Miyake et al. | ................ | 358/1.9 |
| 2012/0050766 A1 * | 3/2012 | Saiki | ............................. | 358/1.9 |

* cited by examiner

*Primary Examiner* — Dung Tran
(74) *Attorney, Agent, or Firm* — Canon USA, Inc., IP Divison

(57) ABSTRACT

An image processing apparatus for generating dot data to form an image by forming dots on a recording medium includes a receiving unit, a first, second, and third generating unit, and a correcting unit. The receiving unit receives first and second image data included in image data. The first generating unit generates, per the first image data, first ink color data representing a multi-valued signal value corresponding to an ink color. The second generating unit generates, per the second image data, second ink color data representing a multi-valued signal value corresponding to an ink color. The correcting unit corrects the signal value represented by the generated first and second ink color data. The third generating unit generates, per the first and second ink color data of which the signal values have been corrected, the dot data representing existence of formation of dots to form an image.

31 Claims, 18 Drawing Sheets

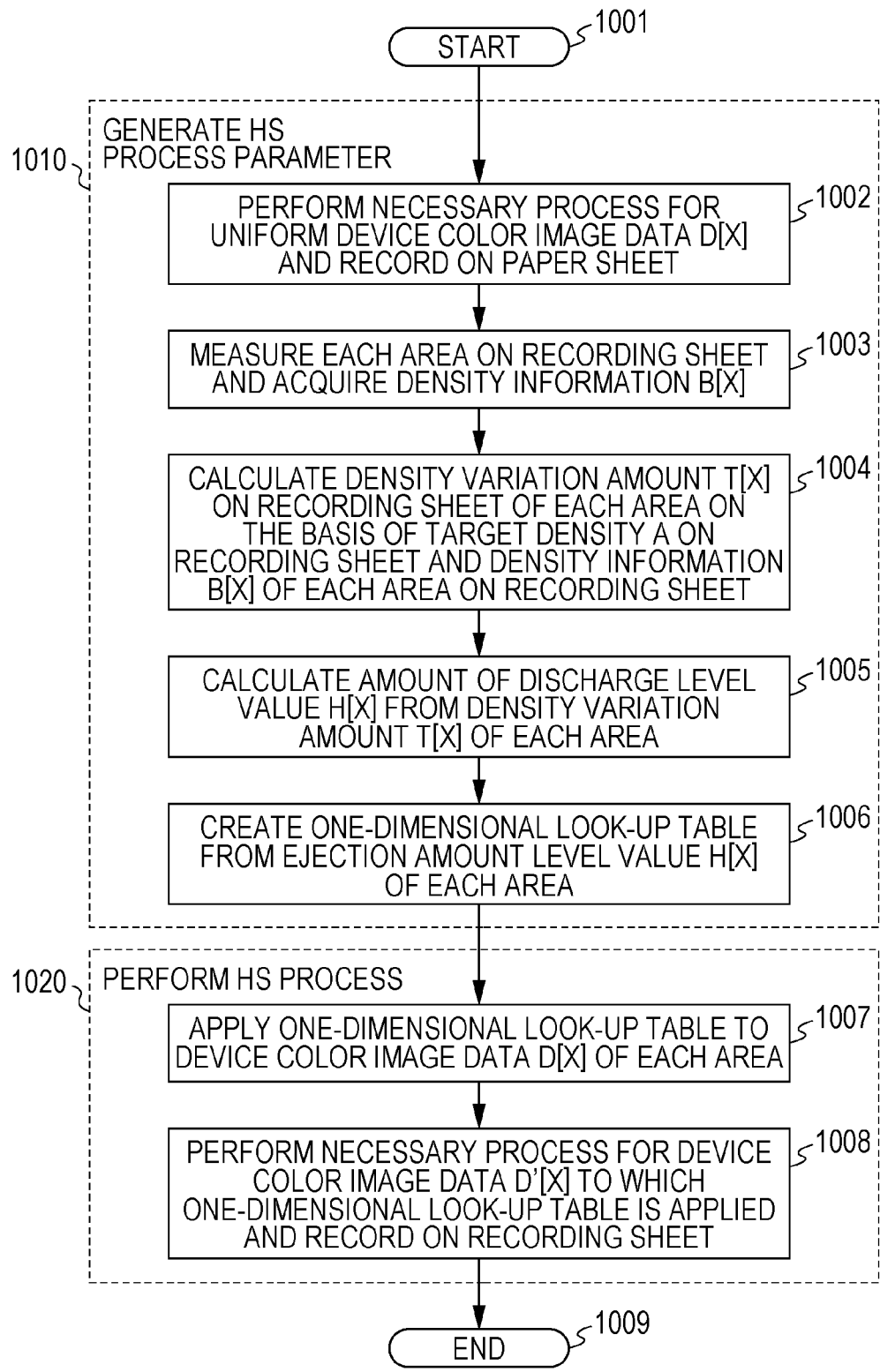

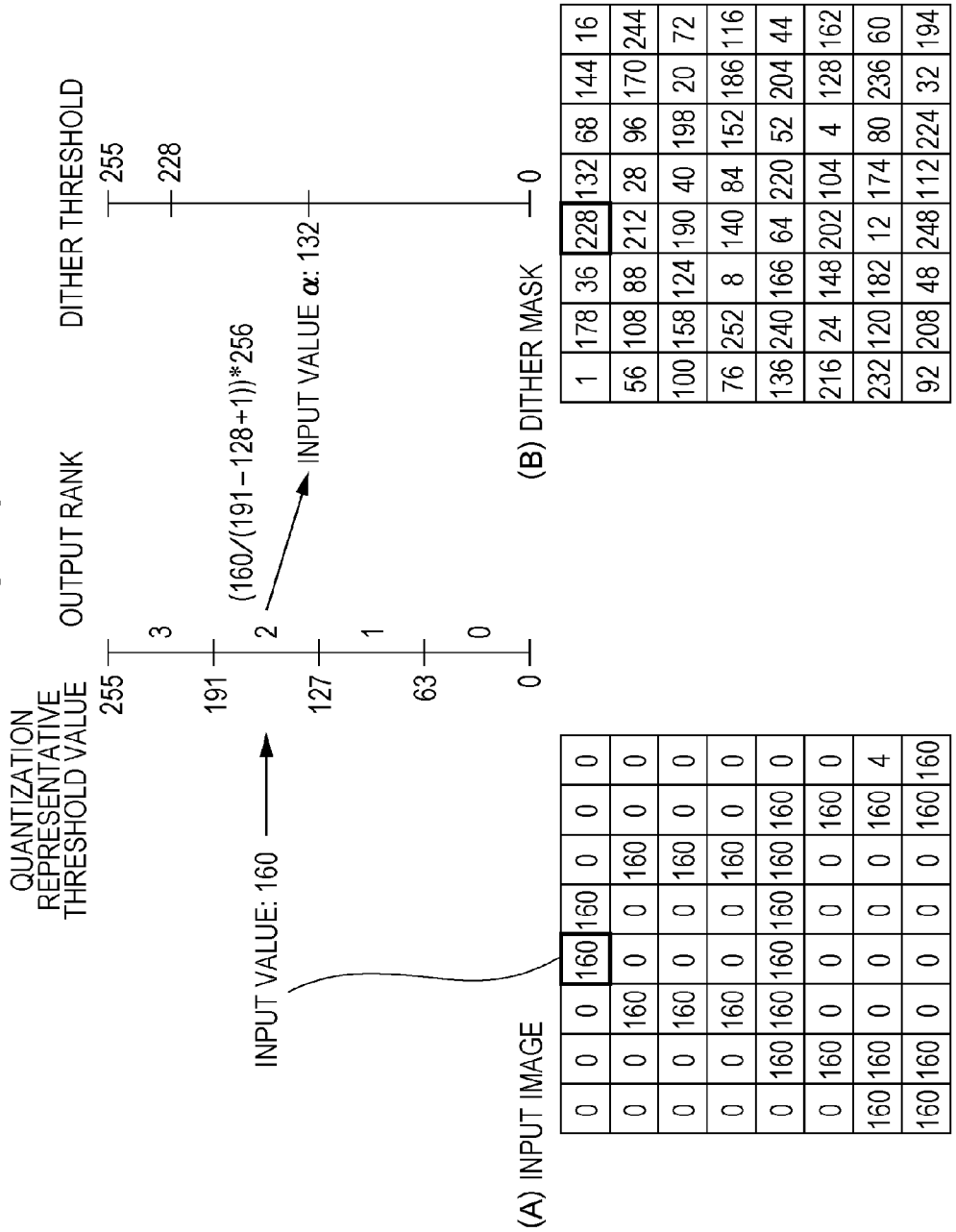

| 1 | 178 | 36 | 228 | 132 | 68 | 144 | 16 |
| 56 | 108 | 88 | 212 | 28 | 96 | 170 | 244 |
| 100 | 158 | 124 | 190 | 40 | 198 | 20 | 72 |
| 76 | 252 | 8 | 140 | 84 | 152 | 186 | 116 |
| 136 | 240 | 166 | 64 | 220 | 52 | 204 | 44 |
| 216 | 24 | 148 | 202 | 104 | 4 | 128 | 162 |
| 232 | 120 | 182 | 12 | 174 | 80 | 236 | 60 |
| 92 | 208 | 48 | 248 | 112 | 224 | 32 | 194 |

| 0 | 0 | 0 | 4 | 4 | 0 | 0 | 0 |
| 0 | 0 | 4 | 0 | 0 | 4 | 0 | 0 |
| 0 | 0 | 4 | 0 | 0 | 4 | 0 | 0 |
| 0 | 0 | 4 | 0 | 0 | 4 | 0 | 0 |
| 0 | 4 | 4 | 4 | 4 | 4 | 4 | 0 |
| 0 | 4 | 0 | 0 | 0 | 0 | 4 | 0 |
| 4 | 4 | 0 | 0 | 0 | 0 | 4 | 4 |
| 4 | 4 | 0 | 0 | 0 | 0 | 4 | 4 |

| 0 | 0 | 0 | 2 | 3 | 0 | 0 | 0 |
| 0 | 0 | 3 | 0 | 0 | 3 | 0 | 0 |
| 0 | 0 | 3 | 0 | 0 | 2 | 0 | 0 |
| 0 | 0 | 3 | 0 | 0 | 2 | 0 | 0 |
| 0 | 2 | 2 | 3 | 2 | 3 | 2 | 0 |
| 0 | 3 | 0 | 0 | 0 | 0 | 3 | 0 |
| 2 | 3 | 0 | 0 | 0 | 0 | 2 | 3 |
| 3 | 2 | 0 | 0 | 0 | 0 | 3 | 2 |

FIG. 19
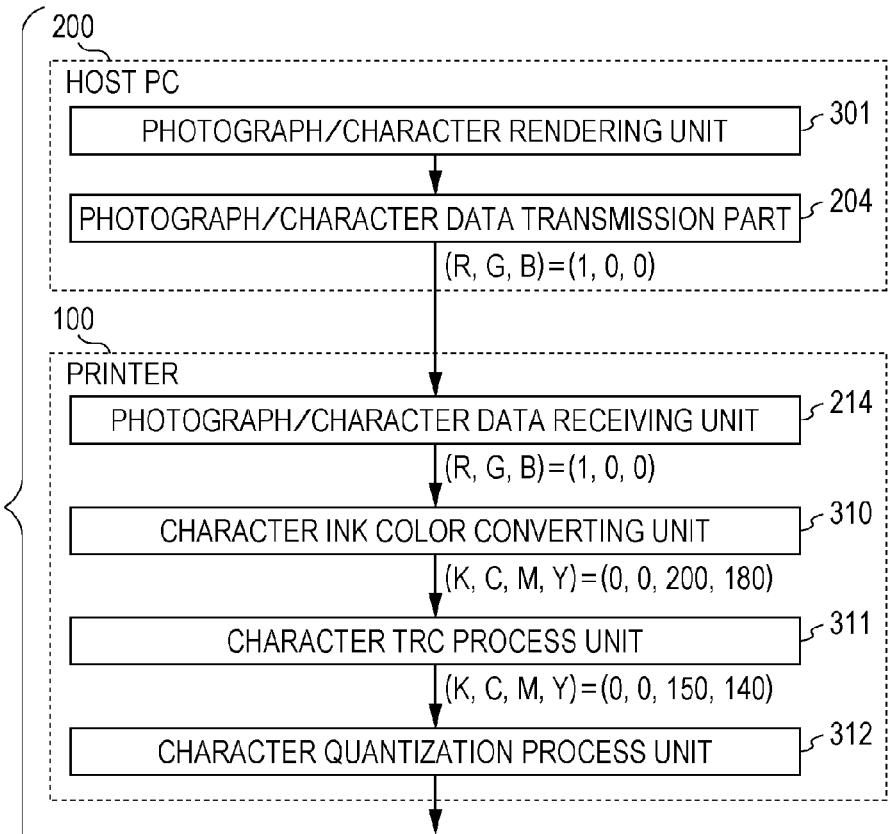
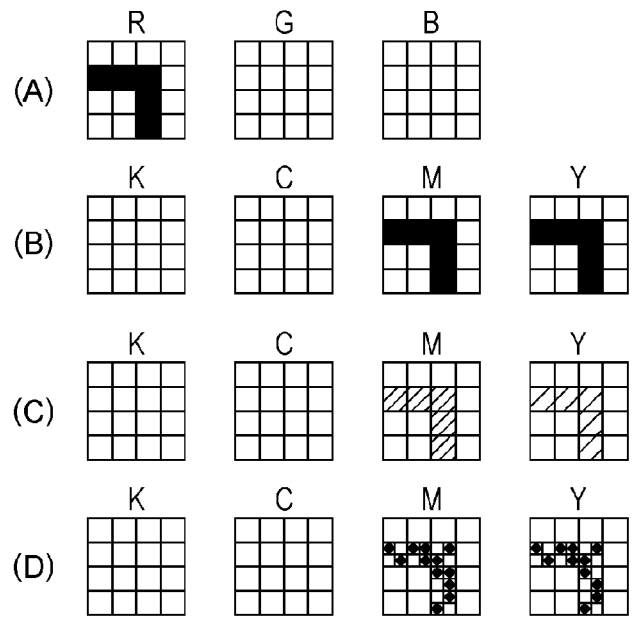

IMAGE PROCESSING APPARATUS AND IMAGE PROCESSING METHOD TO SET APPROPRIATE INK AMOUNT FOR CHARACTER DATA AND FOR IMAGE DATA

BACKGROUND OF THE INVENTION

1. Field of the Invention

The present invention relates to an image processing apparatus and an image processing method.

2. Description of the Related Art

There is a method to perform image processing separately to a character part and to a photograph part of, for example, edited image data or image data obtained by optical scanning.

The United States Patent Application No. 2009/002739 discloses the following method: continuous tone data and binary data are separately encoded by a computer; the encoded data is transferred to an inkjet printer; the data is decoded in the inkjet printer; the continuous tone data undergoes a halftoning process to become binary color data in the inkjet printer; and the binary data and the binary color data are composed into printing data and then used for printing.

Photographic image data and character image data are examples of the edited image data or the image data obtained by optical scanning. Ink color conversion to the continuous tone data of the character image data is not performed. In the method disclosed in the United States Patent Application No. 2009/002739, however, an ink amount to be applied to a recording medium is not appropriate depending on the type of the recording medium and therefore desirable image quality of the printed material is not always obtained.

If an ink ejection amount is not considered and an ink applying amount range of a printing sheet which is a recording medium is exceeded, ink overflow or blurring may occur in the printed material. In such a case, image quality may be affected.

SUMMARY OF THE INVENTION

The present invention provides an image processing apparatus capable of generating binary recording data for which an appropriate ink amount is set for character data and for image data.

According to an aspect of the present invention, an image processing apparatus for generating dot data to form an image by forming dots on a recording medium includes a receiving unit configured to receive first image data representing a tone value of a tone of the image of an image attribute and second image data representing a tone of the image of a character attribute by binary tone values, wherein the first image data and the second image data are included in data of the image;, a first generating unit configured to generate, in accordance with the first image data received by the receiving unit, first ink color data representing a multi-valued signal value corresponding to a color of ink to be used to form an image corresponding to the first image data on the recording medium, a second generating unit configured to generate, in accordance with the second image data received by the receiving unit, second ink color data representing a multi-valued signal value corresponding to a color of ink to be used to form an image corresponding to the second image data on the recording medium, a correcting unit configured to correct the signal value represented by the first and second ink color data generated by the first and second generating units, and a third generating unit configured to generate, in accordance with the first ink color data and the second ink color data of which the signal values have been corrected by the correcting unit, the dot data representing existence of formation of dots to form an image of an image attribute and an image of a character attribute.

Further features of the present invention will become apparent from the following description of exemplary embodiments with reference to the attached drawings.

BRIEF DESCRIPTION OF THE DRAWINGS

FIG. 10 is a flowchart illustrating a head shading (HS) process performed in an embodiment of the present invention.

FIG. 16 is a diagram illustrating a dither process performed in an embodiment of the present invention.

FIG. 19 is a diagram illustrating a process flow to process character data in an embodiment of the present invention.

DESCRIPTION OF THE EMBODIMENTS

First Embodiment

Hereinafter, a preferred first embodiment of the present invention will be described. In the following description, image processing inside a printer main body will be described, but this is merely an example and the present invention is not limited thereto.

Hardware Configuration

Figure 1:
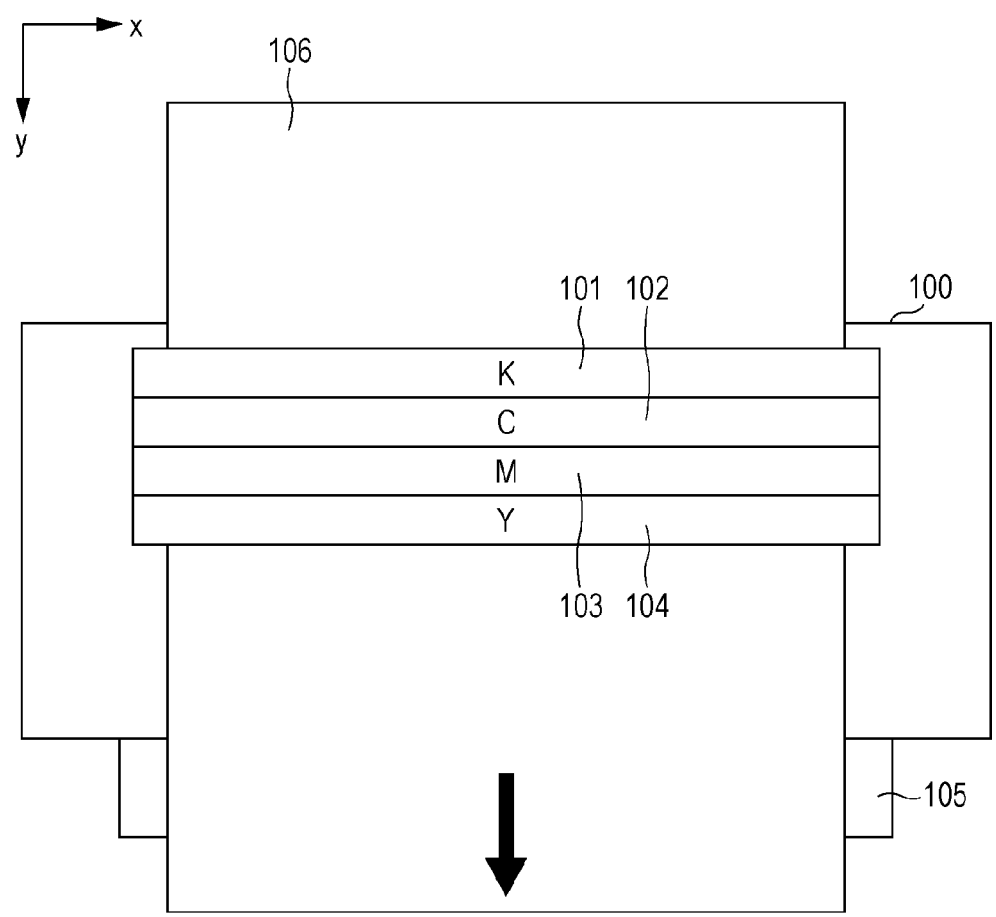
FIG. 1 is a diagram schematically illustrating an inkjet printer related to an embodiment of the present invention.

FIG. 1 is a diagram schematically illustrating a printer which is an inkjet recording apparatus according to an embodiment of the present invention. The printer of the present embodiment is a full line type recording apparatus and includes recording heads 101 to 104 as illustrated in FIG. 1. Each of the recording heads 101 to 104 includes a nozzle array having a width corresponding to that of a recording medium 106. A plurality of nozzles which eject the same kind of ink are arranged at a pitch of 1200 dpi in the x direction (which is a predetermined direction) in the nozzle array. The recording heads 101 to 104 eject black (K), cyan (C), magenta (M) and yellow (Y) ink, respectively. The recording head of the present embodiment is constituted by the recording heads 101 to 104 which eject a plurality of kinds of ink arranged in the y direction as illustrated in FIG. 1.

The recording medium 106 is conveyed in the y direction as illustrated in FIG. 1 when a feeding roller 105 and other unillustrated rollers are rotated by driving force from a motor (not illustrated). When the recording medium 106 is being conveyed, ink is ejected from the nozzles of each of the recording heads 101 to 104 in accordance with recording data at a frequency corresponding to a feeding speed of the recording medium 106. Then, dots of each color are recorded at predetermined resolution corresponding to the recording data and an image for one page is formed on the recording medium 106.

Note that the recording apparatus to which the present invention is applicable is not limited to such a full line type apparatus as described above. For example, the present invention is applicable also to a serial type recording apparatus in which recording is performed with a recording head and a scanner being scanned in a direction which crosses a conveyance direction of a recording medium. Although the recording heads are provided for each color of the ink in the present embodiment, a plurality of colors of ink may be ejected from a single recording head. Alternatively, nozzle arrays corresponding to a plurality of colors of ink may be arranged on a single ejection board.

Figure 2:
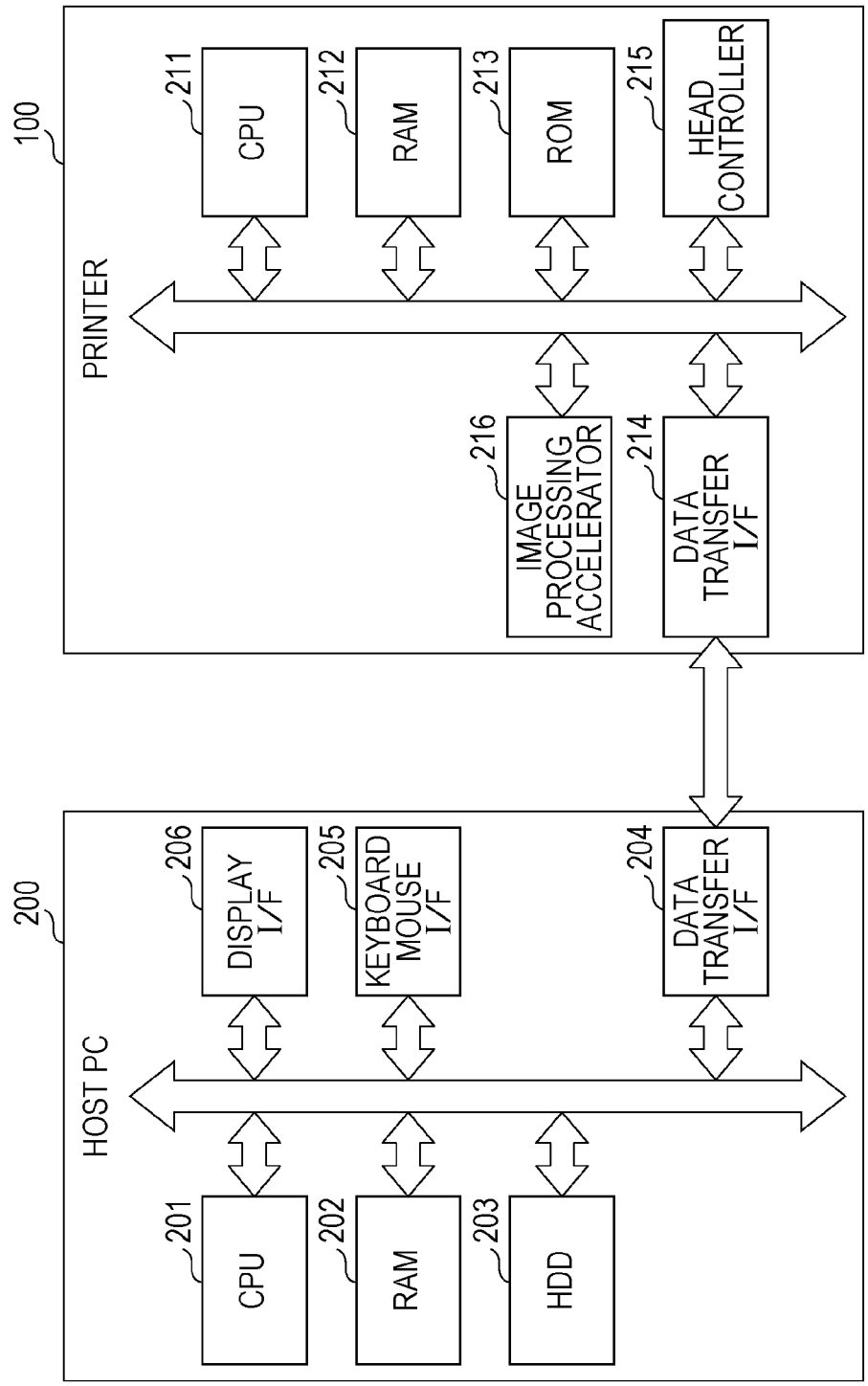
FIG. 2 is a diagram illustrating a recording system related to an embodiment of the present invention.

FIG. 2 is a block diagram illustrating a recording system in an image processing apparatus related to an embodiment of the present invention. As illustrated in FIG. 2, this recording system includes a printer 100 illustrated in FIG. 1 and a personal computer (PC) 200 as a host device of the printer 100.

Figures 17A, 17B, 17C, 17D:
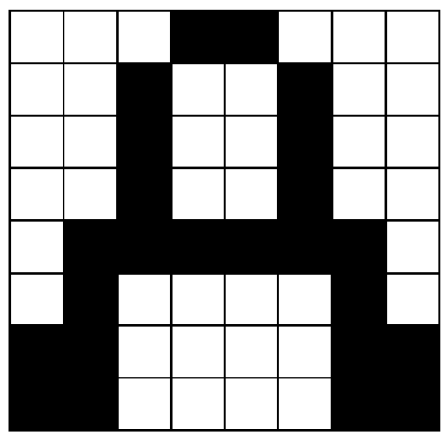
FIGS. 17A, 17B, 17C, and 17D illustrate a dither process performed in an embodiment of the present invention.

The host PC 200 mainly includes the following components. A CPU 201 performs processes in accordance with programs stored in a RAM 202 and a HDD 203 which are storage units. The RAM 202 is a volatile storage which stores a program and data temporarily. The HDD 203 is a nonvolatile storage which stores a program and data. A quantization mask, such as a dither mask as illustrated in FIG. 17B and which will be described later, is also stored in the HDD 203. In the present embodiment, a data transfer interface (I/F) 204 controls transmission and reception of data between the PC 200 and the printer 100. Data transmission and reception may be established using, for example, USB, IEEE 1394 and LAN. A keyboard mouse I/F 205 is an I/F which controls a human interface device (HID), such as a keyboard and a mouse. A user may perform input via the keyboard mouse I/F 205. A display I/F 206 controls display on a display (not illustrated).

The printer 100 mainly includes the following components. A CPU 211 performs processes of each embodiment described later in accordance with programs stored in a RAM 212 and a ROM 213. The RAM 212 is a volatile storage which stores a program and data temporarily. The ROM 213 is a nonvolatile storage which may store table data and a program to be used in processes described later.

A data transfer I/F 214 controls transmission and reception of data between the PC 200 and the printer 100. A head controller 215 supplies recording data to each of the recording heads 101 to 104 illustrated in FIG. 1 and controls ejecting operations of the recording heads 101 to 104. In particular, the head controller 215 may read a control parameter and recording data from predetermined addresses in the RAM 212. When the CPU 211 writes the control parameter and the recording data in the predetermined addresses in the RAM 212, a process is started by the head controller 215 and ink is ejected from the recording heads 101 to 104.

An image processing accelerator 216 is hardware which may perform image processing at a speed higher than the CPU 211. In particular, the image processing accelerator 216 reads a parameter and data necessary for image processing from predetermined addresses in the RAM 212. When the CPU 211 writes the parameter and data in the predetermined addresses in the RAM 212, the image processing accelerator 216 is started and predetermined image processing is performed to the data. In the present embodiment, a determination process of the quantization mask which will be described later is performed in software processing of the CPU 211. Image processing for recording including processing in a quantization processing unit is performed by hardware in the image processing accelerator 216. The image processing accelerator 216 is not a necessary component: the creation process of the table parameter and the image processing may be performed only by the process by the CPU 211 depending on, for example, the specification of the printer.

Hereinafter, an entire configuration of the image processing in the present embodiment will be described with reference to FIG. 3.

Figure 3:
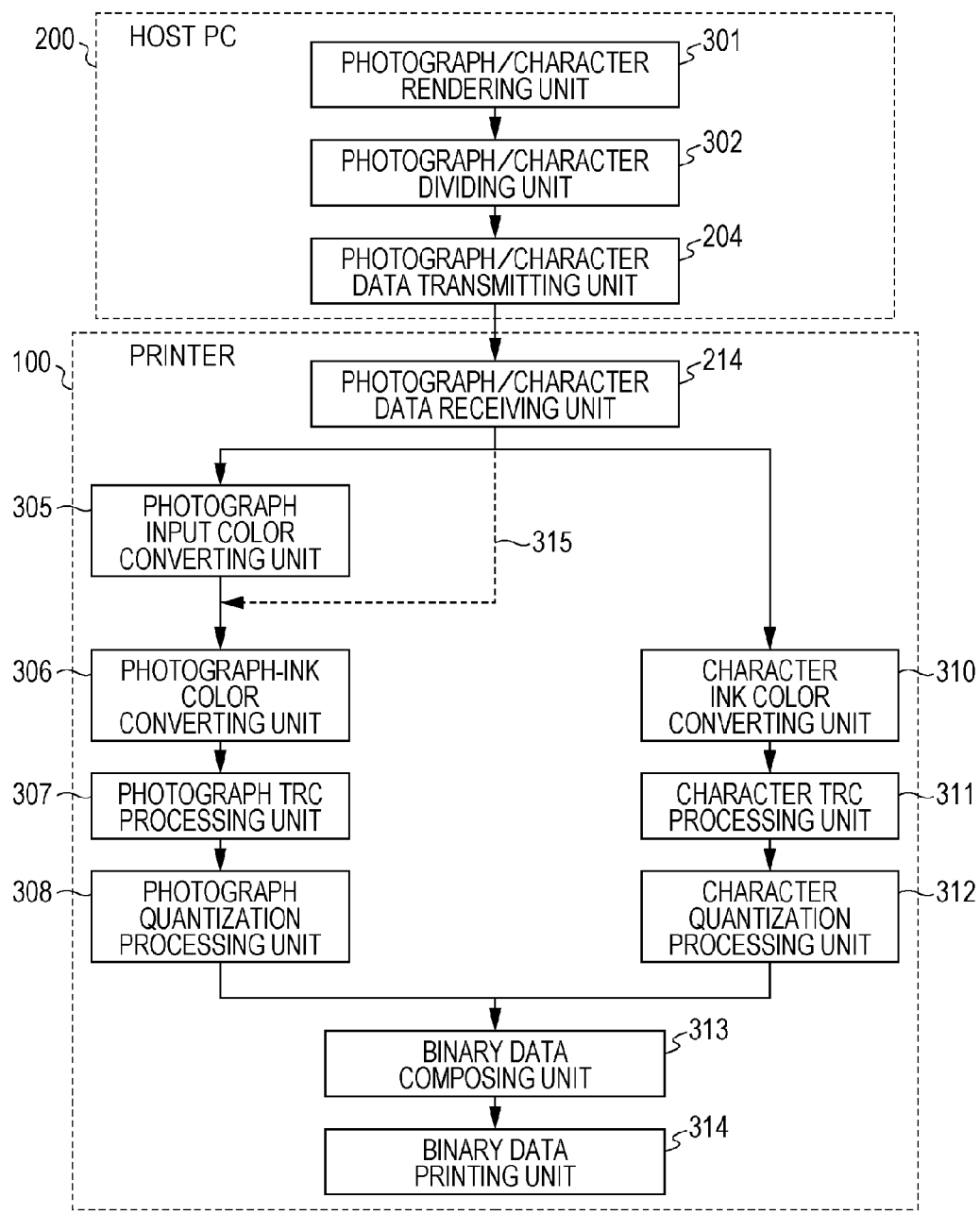
FIG. 3 is a block diagram illustrating a configuration of image processing performed by an inkjet printer related to an embodiment of the present invention.

FIG. 3 is a block diagram illustrating a configuration of the image processing performed by the inkjet printer related to a first embodiment of the present invention. In the present embodiment, an image processing unit is constituted by components for controlling and processing of the printer 100 illustrated in FIG. 1. Application of the present invention is not limited to the described form. For example, the image processing unit may be implemented in the host PC 200 illustrated in FIG. 2 or, alternatively, a part of the image processing unit may be included in the host PC 200 and the rest of the image processing unit may be included in the printer 100.

As illustrated in FIG. 3, image data stored in the host PC 200 is rendered in a photograph/character rendering unit 301. The rendered image data is then divided into photograph image data ("first image data") and character image data ("second image data") in a photograph/character dividing unit 302. In the present embodiment, image data previously divided into the picture image data and the character image data is used as input image data.

Here, the following description will be provided with photograph image data described as an exemplary picture image data. For example, two layers, one for full color image data and the other for monochrome image data, may be prepared in the TIFF file format: the full color image data may be used as the photograph image data and the monochrome image data may be used as the character image data. Alternatively, data may be stored in the PDF file format: the photograph image data may be stored as bit map data and the character image data may be stored as vector data. Further, rendering intents of an image may be referred to: "perceptual" may be used as the photograph image data and "colorimetric" may be used as the character image data. In addition, a file format in which identification information of attributes of a photograph and characters are described may be created regarding image data and photograph/character determination may be performed in accordance with the identification information.

The photograph image data is image data which represents color tone of an image with 8-bit RGB signals. The character image data is image data which represents color tone of an image with 1-bit binary data. The character image data may be prepared depending on the number of colors to be reproduced. For example, a single plane of 1-bit binary format image may be prepared when only black characters are used as the character image data and four planes of 1-bit binary image may be prepared when cyan characters, magenta characters, yellow characters and black characters are used as character image data. The character image data may also be 2-bit 4-valued data including edge information. Alternatively, image data is not necessarily held in each plane: for example, 3-bit data (2 bits of color information and 1 bit of character information) may be held on a single plane. By reducing a transfer amount to be smaller than related art character image data constituted by the 8-bit RGB signal value, data transfer may be performed at a lower cost and at a higher speed.

The divided image data is transferred from the photograph/character data transmitting unit 204 to the photograph/character data receiving unit 214 of the printer 100.

The image data obtained upon reception by the printer 100 is divided into photograph image data and character image data in the photograph/character data receiving unit 214. The photograph image data becomes photograph binary data ("second dot data") by processes in a photograph input color converting unit 305, a photograph-ink color converting unit 306, a photograph tone reproduction curve (TRC) processing unit 307 and a photograph quantization processing unit 308. The character image data becomes character binary data ("first dot data") by a character ink color converting unit 310, a character TRC processing unit 311 and a character quantization processing unit 312.

In the processing units 305 to 308 which process the photograph image data, the photograph input color converting unit 305 first converts the photograph input image data received from the photograph/character data receiving unit 214 into image data corresponding to a color gamut of a printer. In the present embodiment, the image data to be input is data which represents color coordinates (R, G, B) in color space coordinates, such as sRGB which are expression colors of a monitor. The photograph input color converting unit 305 converts the each 8-bit R, G and B input image data into image data of color gamut of the printer (R', G', B') by a known method, such as a matrix operation and a processing using three-dimensional LUT. In the present embodiment, the conversion process is performed using a three-dimensional look-up table ("3DLUT") and performing an interpolating calculation.

The photograph-ink color converting unit 306 converts each 8-bit R, G and B image data which has been processed in the photograph input color converting unit 305 into first ink color data which is the image data representing a signal value corresponding to a color of ink used in the printer. Since the printer 100 of the present embodiment uses ink of black (K), cyan (C), magenta (M) and yellow (Y), the image data of RGB signals is converted into image data constituted by 8-bit color signals of K, C, M and Y. This color conversion also uses both the three-dimensional look-up table and the interpolating calculation in the same manner as in the photograph input color converting unit 305 described above. As another conversion method, a matrix operation may be used. Although the number of colors of ink is four (K, C, M and Y) in the description above, other colors of ink, such as light-colored cyan (Lc), light-colored magenta (Lm) and gray (Gy) may be added.

For the photograph image data constituted by each 8-bit ink color signal processed and generated in the photograph-ink color converting unit 306, the photograph TRC processing unit 307 performs correction to adjust the number of dots to be recorded in the binary data printing unit 314 for each ink color.

The photograph quantization processing unit 308 performs a quantization process to each 8-bit 256-valued ink color photograph image data processed in the photograph TRC processing unit 307 and generates 1-bit binary data representing "1" (recording) or "0" (non-recording) as data which represent existence of dot formation. However, the form of the photograph quantization processing unit 308 is not particularly limited in the implementation of the present invention.

The character image data is processed in the processing units 310 to 312. First, the character ink color converting unit 310 converts 1-bit binary image data into second ink color data which is character image data representing a multi-valued color tone signal of ink used in the printer. For the generated ink color data, the character TRC processing unit 311 performs correction to adjust the number of dots recorded in the binary data printing unit 314 for each ink color. For the ink color character image data, the character quantization processing unit 312 performs a quantization process and generates 1-bit binary data representing "1" (recording) or "0" (non-recording).

The binary data composing unit 313 composes the data obtained by quantization of the photograph image data and the data obtained by quantization of the character image data into composed dot data.

The binary data printing unit 314 drives the recording heads to eject ink of each color on the recording medium to perform recording in accordance with binary data (dot data) obtained by quantization. In the present embodiment, the binary data printing unit 314 is constituted by a recording mechanism which includes the recording heads 101 to 104 illustrated in FIG. 1.

Figure 4:
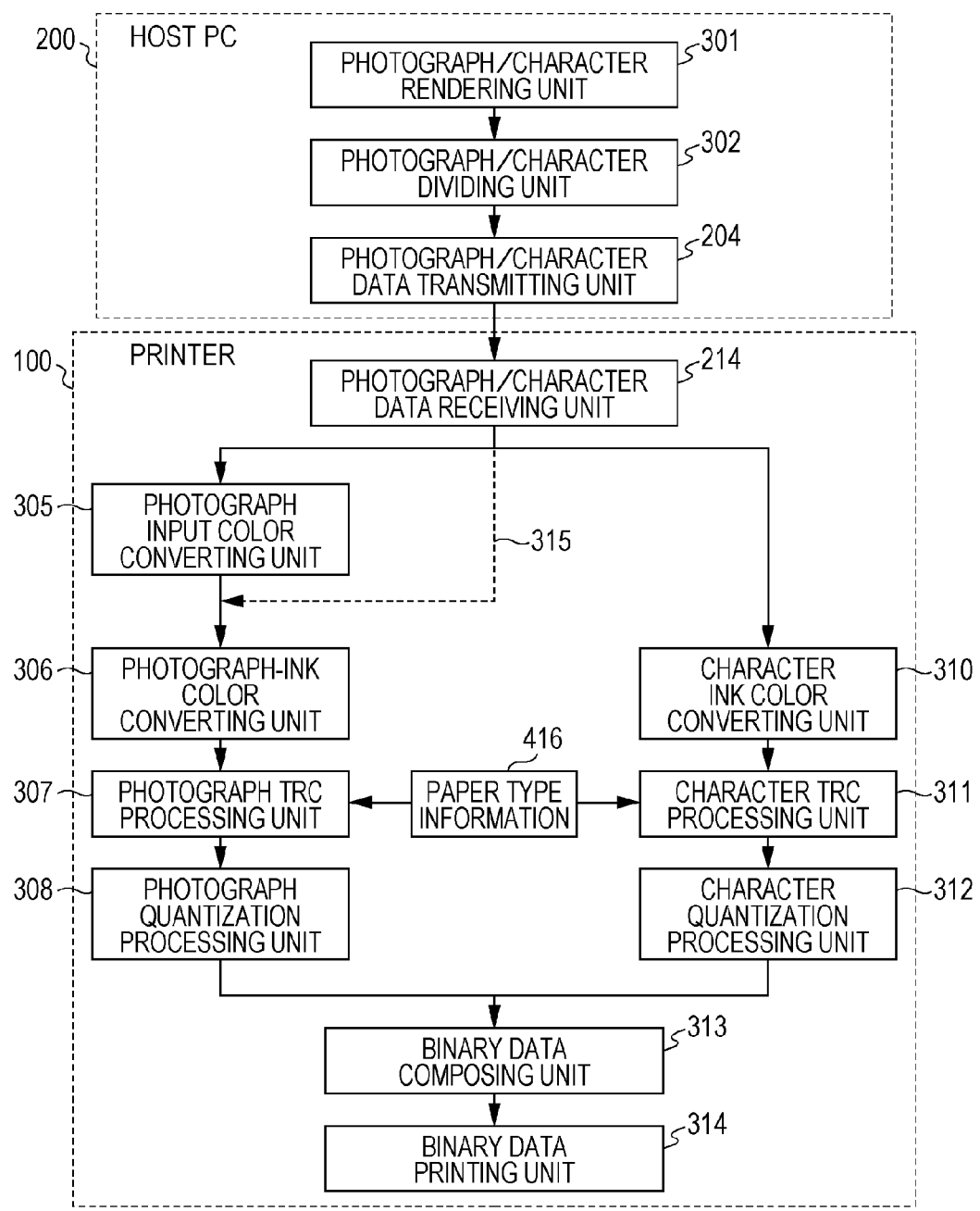
FIG. 4 is a block diagram illustrating a recording system which adjusts an ink amount with reference to paper type information in an embodiment of the present invention.

At the time of recording an image for measurement, the image data (R, G, B) is input in the photograph-ink color converting unit 306 without undergoing the process of the photograph input color converting unit 305. Such a path is illustrated by a broken line 315 as a bypass in FIG. 4. For the process through the bypass, a table with which, for example, an input value equals to an output value is prepared and the image data processed by the table is input in the photograph-ink color converting unit 306. However, a process may be performed with which the input value may be output directly.

Here, the photograph-ink color converting unit 306 and the character ink color converting unit 310 of the present embodiment will be described in detail. The photograph-ink color converting unit 306 converts the input image data constituted by 8-bit RGB signal values into image data constituted by each of 8-bit K, C, M and Y color signals. For high-quality reproduction of a photograph on a paper sheet, black color defined, for example, as (R, G, B)=(16, 16, 16) is constituted not by only K ink but by four colors of C, M, Y and K ink. This is because a greater number of tints may be reproduced if black color is reproduced using C, M, Y and K ink than in a case in which black color is reproduced only by K ink. Thus, the tone characteristic near the black color may be improved.

The character ink color converting unit 310 converts the 1-bit input image data representing whether the data is a character or not (hereafter, if the data is a character, the input image data is referred to as "1" and otherwise referred to as "0") into multi-valued image data constituted only by 8-bit color signals.

For example, a black pixel is defined as a signal value 1 and a white pixel is defined as a signal value 0. In the character ink color converting unit 310, the ejection characteristic of the ink is defined as (K, C, M, Y)=(255, 0, 0, 0) with respect to the black pixel defined as (K)=(1) and the ejection characteristic of the ink is defined as (K, C, M, Y)=(0, 0, 0, 0) with respect to the black pixel defined as (K)=(0). Then, binary data is printed in accordance with the process flow diagram of FIG. 3.

Regarding the black color of the character image data, an increase in visibility of the characters is required rather than an increase in tone reproduction as in the photograph part. Therefore, in order to reproduce the black color of the character image data in the example above, use of K ink which is defined as (K, C, M, Y)=(255, 0, 0, 0) may be sufficient.

In the printing system illustrated in FIG. 1, not every recording head of K, C, M and Y may eject ink to an accurate position. Droplet landing positions may vary depending on attachment errors of the recording heads or variation in droplet landing accuracy. If variation occurs in the droplet landing positions, edge portions may be blurred and visibility may be decreased. If a black thin line is reproduced only with K ink, since misalignment among other recording heads does not occur, the thin line is not blurred by other ink and thus visibility may be improved.

In this manner, even when the same black color is printed, tone characteristics may be improved in the photograph part and visibility may be improved in the character part by changing color of the ink to be ejected on the paper sheet in the photograph part and in the character part. Therefore, in the present embodiment, the input image data is divided into a photograph part and a character part in the host PC.

In the present embodiment, another reason to divide the photograph part and the character part of the input image data before processing is to change an applying amount of the K ink even when the same black input image data is to be printed with only the K ink. That is, with respect to the black color defined as (R, G, B)=(16, 16, 16), K ink is ejected to the photograph part so that (K, C, M, Y)=(240, 0, 0, 0). In the character part, in order to increase contrast of the characters, the K ink is ejected so that (K, C, M, Y)=(250, 0, 0, 0) with respect to the black pixel defined as (K)=(1). In this manner, even when the same black input image data is to be printed, the characters may be printed thicker than the photograph and thus the characters may be highly visible. If a paper sheet on which ink bleeding may occur, such as plain paper, is used, when the K ink is ejected so that (K, C, M, Y)=(240, 0, 0, 0) with respect to the black pixel defined as (K)=(1) in the character part, the K ink bleeds and therefore visibility of small characters and complicated characters may be reduced. When printing is performed on such a type of paper, ink color conversion may be performed to reduce an ejection amount of K ink. Then, by defining as (K, C, M, Y)=(220, 0, 0, 0), the ink ejection volume may be reduced and characters with reduced bleeding may be reproduced. Also from these reasons, it is necessary to divide the photograph part from the character part of the input image data before an ink color conversion process.

In addition, with respect to the black pixel (K)=1, rich black color defined as (K, C, M, Y)=(0, 200, 200, 200) may be created which may reproduce black color that is thicker than the simple black color.

In this manner, the volume of data at the time of transfer may be reduced and an ink applying amount may be controlled depending on the paper type.

Although the black pixel (K) is described in the foregoing, the color of ink is not limited to the same. The above-described embodiment is also applicable to ink color characters.

Then, binary data is printed in accordance with the process flow diagram of FIG. 3.

Although the character image data has been described as 1-bit binary data in the present embodiment, the character image data may be represented as 3-bit 8-valued data so that not only black characters but ink color characters may be expressed at the same time.

For example, in the photograph/character rendering unit, a lower-order 1 bit is allocated for the determination whether the pixel is a character pixel and higher-order 2 bits are allocated to four colors. In the character ink color converting unit 310, values of (K, C, M, Y) corresponding to the higher-order 2 bits are determined previously and the values are allocated in accordance with the lower-order 1 bit.

Further, in a case in which the character image data is represented by RGB planes and when each of the R, G and B is transferred as binary data, it is possible to set (K, C, M, Y)=(0, 0, 255, 255) with respect to (R)=1. Similarly, by previously defining combinations of K, C, M and Y regarding G and B planes, color characters of R, G and B may be expressed.

In this manner, the character image data is not limited to binary data held on a single plane: it is sufficient that the character image data includes dot existence information which represents whether the data is a character.

Therefore, the character image data may undergo ink color conversion in order to improve visibility of not only black characters but ink color characters at the same time.

The ink color conversion may change converting method depending on the position on the plane.

For example, if edge information is included in the character image data, the ink color is defined as (K, C, M, Y)=(255, 0, 0, 0) at the edge portion and the ink color is defined as (K, C, M, Y)=(0, 200, 200, 200) with respect to the black pixel (K)=(1) at other portions than the edge portion, such as inside the characters. In this manner, robustness to the misalignment among colors is increased. Even if slight misalignment occurs among colors, it becomes difficult to view other colors near the black characters and, therefore, visibility may be improved.

Then, binary data is printed in accordance with the process flow diagram of FIG. 3.

Next, the photograph TRC processing unit 307 illustrated in FIG. 3 will be described. For the photograph image data constituted by each 8-bit ink color signals processed in the photograph-ink color converting unit 306, signal values of ink color signals for adjusting the number of dots recorded is corrected for each ink color. Since the number of dots to be recorded on the recording medium and the optical density achieved on the recording medium by the number of dots are not in a linear relationship, each 8-bit image data is corrected to adjust the number of dots to be recorded on the recording medium in order to correct the relationship.

In the character TRC processing unit 311 illustrated in FIG. 3, the signal values are corrected similarly.

There is a variation in ejection amount of the ejection nozzles for ejecting ink due to manufacture error of the nozzles. It is known that the ejection amount varies depending on the ambient temperature of the printer. With such a technological background, it is not desirable to record the black character part always using black ink of constant density.

The ejection amount may vary depending on the characteristics of ink for some ink colors. When ink color characters and color characters are to be printed, it is necessary to control the number of dots individually for all the ink color.

As will be described later, if the character part and the photograph part are different in resolution, the ink applying amount may be different. Therefore, it is necessary to perform a character TRC process using a correction parameter different from that in the photograph TRC processing unit.

From these reasons, it is necessary, in the inkjet printer, to control the number of dots recorded on the recording medium and to perform the TRC process also in the character part.

Since the ink applying amount which is the amount of ink to be accepted varies depending on the paper type, it is necessary to control the number of dots. Hereinafter, adjustment of the ink amount will be described in detail with reference to FIG. 4. It is necessary to perform the TRC process in accordance with the paper type information in the photograph TRC processing unit 307 and the character TRC processing unit 311.

There are some types of paper. A first type receives a large applying amount of ink: that is, a receptive layer of the paper is thick and thus a large amount of ink may be applied. A second type receives a small applying amount of ink: that is, a receptive layer of the paper is thin and thus a smaller amount of ink may be applied as compared with the paper which receives a large ink applying amount. In this situation, if various kinds of paper sheets are used for printing at constant applying amount of ink without considering paper type information 416, ink overflow or blurring may occur.

For example, if the ink applying amount is designed for the paper with large ink applying amount, when printing is performed using a paper sheet for a small ink applying amount, a greater amount of ink than the absorption limit of the receptive layer of the paper is applied. As a result, ink overflow may occur and the ink may undesirably adhere to the printed material and to the inside of the printer. On the other hand, if the ink applying amount is designed for the paper with small ink applying amount, when printing is performed using a paper sheet for a large ink applying amount, the ink applying amount is insufficient. As a result, blurring of the ink may occur on the paper sheet.

Therefore, in the photograph TRC processing unit 307 and the character TRC processing unit 311, processes are performed with reference to paper type information 416, respectively.

From this reason, in the present embodiment, the paper type information 416 is considered during the TRC process. However, the paper type information may be considered in the ink color converting unit. In this case, depending on the paper type at the time of the ink color conversion, ink color conversion for which paper type information is considered is performed and, in the TRC process, a process is performed using a table with which the input value equals to the output value.

Next, the photograph quantization processing unit 308 and the character quantization processing unit 312 of FIG. 3 will be described.

To each 8-bit 256-valued ink color photograph image data or character image data, a quantization process is performed to the photograph image data of the ink color and generates 1-bit binary data representing "1" (recording) or "0" (non-recording).

For example, 8-bit image data may be converted directly into binary data (dot data) or may be quantized to several-bit multi-valued data and finally converted into binary data. Desirably, the quantization method is a dither method. When the binary data described later is to be composed by, for example, an error diffusion method, a pixel is in a dependence relationship with neighboring pixels. Therefore, there may be an influence on a dot arrangement at a boundary portion of the character part and the photograph part. In the dither method in which a dither matrix is used, ejection control of the ink dot is performed for each pixel and, therefore, a pixel is not in a dependence relationship with neighboring pixels. Since pixels are not affected each other even when the two kinds of binary data are composed together, the dither method is useful in the present embodiment. However, the quantization method is not limited in the present embodiment and other pseudo halftone processes may also be employed.

The photograph quantization processing unit 308 and the character quantization processing unit 311 may perform the same process or different processes, but these units operate independently. Therefore, in a case of a hardware process, parallel processing may be performed by quantization, such as a dither process, and image processing may be performed at a high speed.

The binary data (dot data) obtained by quantization represents which ink is to be ejected at each pixel position. Usually, the photograph part and the character part are mutually exclusive and, at a pixel position at which the ink for the photograph part is to be ejected, the ink for the character part is not ejected. Similarly, at a pixel position at which the ink for the character part is to be ejected, the ink for the photograph part is not ejected. Therefore, in the binary data composing unit 313, composed printing data may be created by simply adding two kinds of binary data.

In the present embodiment, the same process may be performed at different resolutions. The higher the resolution, the higher the visibility of characters of the character image. As for the photographic image, since tone characteristics have a larger influence than the resolution on the image quality, resolution as high as that for the character image is not necessary. That is, by reducing the resolution of the photograph image data to be lower than the resolution of the character image data, the data volume of the entire image data may be reduced without changing the visibility of the character. Transmission load of the image data may be reduced and, by performing processes using the photograph image data of 600 dpi until the quantization process, process load may also be reduced.

For example, the resolution of the character image data is set to 1200 dpi and the resolution of the photograph image data is set to 600 dpi. With reference to the process flow diagram of FIG. 3, the character image data and the photograph image data are separately processed until the quantization process and the resolution of the photograph image data is increased to 1200 dpi from 600 dpi in the photograph quantization processing unit 308. By performing processes using the photograph image data of 600 dpi until the quantization process, process load may also be reduced.

Case in which photograph image data of 600 dpi undergoes an error diffusion process in the photograph quantization processing unit 308 and character image data of 1200 dpi undergoes an error diffusion process in the character quantization processing unit 312 will be described. If the same error diffusion process is performed for the photograph image data of 600 dpi and the character image data of 1200 dpi, the dot pattern per unit area on the paper sheet is different and therefore the relationship between the density and the ink applying amount is different. Therefore, it is necessary to perform the TRC process using different tables in the photograph TRC processing unit 307 and in the character TRC processing unit 311 in order to adjust the ink applying amount. There is the same necessity in a case in which, if the quantization process is the dither process, masks of different patterns or masks of the same size on the paper sheet are used. Further, if the resolution is different, when different processes are performed in the photograph quantization processing unit and in the character quantization processing unit, it is necessary to adjust the ink applying amount.

Note that the ink applying amount may be adjusted in the ink color converting unit in order to correct the relationship between the density and the ink applying amount during quantization.

Next, image data of the same resolution is composed in the binary data composing unit 313 and binary data is printed in the binary data printing unit 314. Alternatively, in the photograph/character data receiving unit 214, the resolution of the photograph image data may be increased from 600 dpi to 1200 dpi. In this case, the resolution may be increased by the nearest neighbor method or by the bicubic method, and that method is not particularly limited in the present embodiment.

FIG. 19 illustrates a process flow regarding the character image data.

In the photograph/character rendering unit 301 illustrated in FIG. 19, the photograph image data and the character image data which have been divided from the input image are sent to the photograph/character data transmitting unit 204. The character image data is the data which includes dot existence information. In the description of FIG. 19, each pixel has dot existence information in every plane of each color of R, G and B. In the example of (A) in FIG. 19, the R plane has the dot existence information.

Then, the data described above is received in the photograph/character data receiving unit 214 and the received data sent to the character ink color converting unit 310. The character image data undergoes ink color conversion into a predetermined color in the character ink color converting unit. Here, as for the pixel determined to have a dot (1) on the R plane, the signal value of each pixel is set to 200 on the M plane of (B) and the signal value of each pixel is set to 180 on the Y plane. The character image data converted into CMYK is sent to the character TRC processing unit 311.

In the character TRC processing unit 311, the character image data sent from the ink color converting unit 310 is converted in consideration of the ink applying amount depending on the paper type information 416 and corrected. The data set to 200 on the M plane in (B) is converted into data of which signal value of each pixel is 150 in (C) by a conversion table in which a predetermined for each paper type is considered. The data set to 180 on the Y plane in (B) is converted into data of which signal value of each pixel is 140 in (C).

The character image data sent from the character TRC processing unit 311 is quantized in the character quantization processing unit 312. The quantizing method may be, for example, an error diffusion method or the dither method. For each color, tone is lowered such that output in each pixel is 0 to 4 value output. Then, each area obtained by subdividing a pixel into four in accordance with an output value of the pixel of each plane is converted into binary data representing "1" (recording) or "0" (non-recording) in (D). In (D), the number of dots is 0 in K and C, and the dot arrangement in the pixels is determined in accordance with the signal values of the pixels of the character image data after correction in M and Y.

In the present embodiment, the photograph image data and the character image data undergo processes in separate process flows from the input color conversion to the quantization process, and two obtained binary data are composed in the binary data composing unit 313. With such process flows, it is possible to separately perform the ink color conversion, the TRC process and the quantization process to the photograph image data and the character image data. The data may be transferred at a smaller amount of information by transferring the character image data as data which includes dot existence information representing whether the data is a character and ink overflow may be prevented through an appropriate adjustment by correcting the data in a state of multi-valued data with an ink applying amount being considered in the ink color converting unit and the TRC processing unit for each paper type. Further, it is also possible to express ink color characters and color characters by previously defining composition of the ink in accordance with the data including dot existence information in the ink color converting unit.

Second Embodiment

In the first embodiment, the photograph image data and the character image data which have been divided are composed after the quantization process is terminated. In the present embodiment, composition of the two kinds of image data is performed before the quantization process. The process flow will be described with reference to FIG. 5.

In the present embodiment, head shading for correcting unevenness in the density resulting from variation in the ejection characteristic among a plurality of nozzles may be performed in a head shading (HS) processing unit 502.

First, the head shading will be described.

Figure 7A:
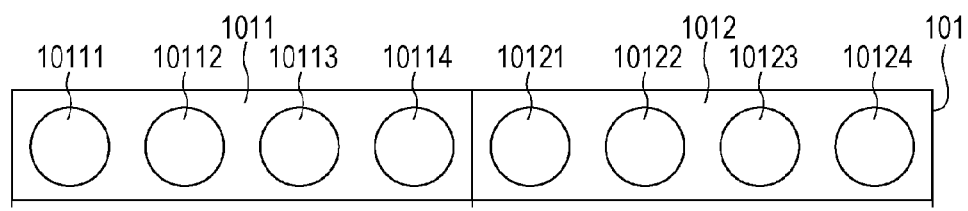
FIGS. 7A and 7B are diagrams illustrating a dot arrangement pattern of a recording head having nozzles of which ejection amounts are the same.
Figure 7B:
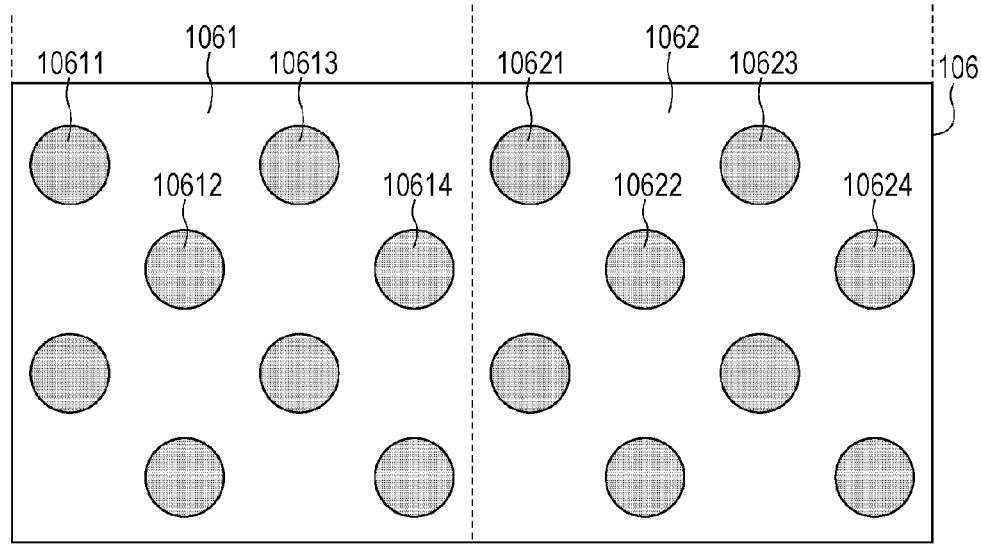

FIGS. 7A and 7B are diagrams illustrating, in each nozzle on the ejection board, a recording head having nozzles of which ejection amounts are the same on each ejection board and a dot arrangement pattern expressed by the ink ejected from the recording head. The reference numeral 101 of FIG. 7A denotes a recording head which ejects the K ink ("first ink"). For the ease of description and illustration, only eight nozzles of the nozzle arrays in the recording head are illustrated in FIG. 7A. FIG. 7B is a diagram illustrating a recorded state of a 50% duty solid image recorded on the recording medium 106 using the nozzles of FIG. 7A. This is a model in which the ink dot is ejected at half a ratio of the 100% duty model. In the recording medium 106, an area in which recording is performed using the left four nozzles of FIG. 7A is defined as a first area and an area in which recording is performed using the right four nozzles of FIG. 7A is defined as a second area. For the ease of description, the nozzles and the dots recorded by the ink ejected from each nozzle are the same in size in FIGS. 7A and 7B, but these are not the same in size actually. The ejection amount from each nozzle varies due to other factors than the nozzle diameter and variation in the ejection amount is not necessarily contributed by the nozzle diameters. Here, nozzles having a greater ejection amount are illustrated as a large circle in FIG. 8A.

Figure 8A:
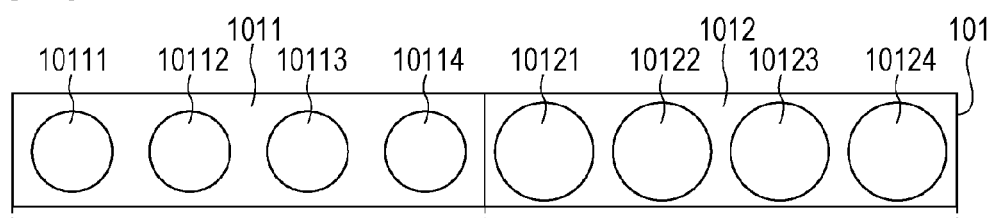
FIGS. 8A and 8B are diagrams illustrating a dot arrangement pattern of a recording head having nozzles of which ejection amounts are different.
Figure 8B:
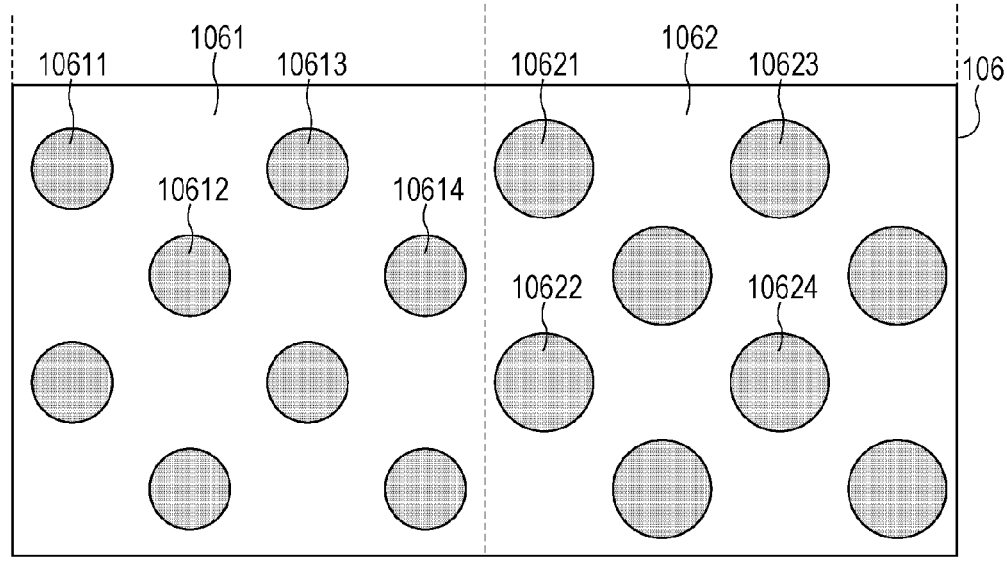

All of eight nozzles 10111 to 10114 and 10121 to 10124 of the recording head 101 may eject a standard amount of ink in a standard direction. Therefore, dots of the same size are recorded on the recording medium 106 at constant intervals. FIGS. 8A and 8B are diagrams illustrating, in each nozzle on the ejection board, a recording head having nozzles of which ejection amounts are different for each ejection board and a dot arrangement pattern expressed by the ink ejected from the recording head. FIG. 8A is a diagram illustrating nozzles of each recording head. FIG. 8B is a diagram illustrating a recorded state of a 50% duty solid image recorded on the recording medium 106 using the nozzles of FIG. 8A.

Here, among eight nozzles of the recording head 101 of FIG. 8A, the left four nozzles 10111 to 10114 eject a standard amount of ink and the right four nozzles 10121 to 10124 eject an amount greater than the standard ejection amount of ink. If a recording head which includes nozzles of which ejection amounts are varied, like this recording head 101, there is a possibility that color densities are different at different areas when an image of the same color is recorded on the recording medium. In an area in which recording is performed using the left four nozzles of FIG. 8A ("first area"), a solid image of standard density is recorded. In an area in which recording is performed using the right four nozzles of FIG. 8A ("second area"), since the size of each dot is large, a solid image of which density is higher than that of the first area is recorded. That is, the first area and the second area are different in density.

When a recording head having such ejection characteristics is used, correction of image data by the HS process is performed. This process will be described with reference to FIGS. 9A and 9B. Among all the nozzles of the recording head 101, correction is performed to the image data corresponding to the right four nozzles 10121 to 10124 so as to lower the density. In particular, dot data (binary data) which defines recording (1) or non-recording (0) is generated so that the number of dots recorded by the right four nozzles 10121 to 10124 is smaller than the number of dots recorded by the left four nozzles 10111 to 10114. FIG. 9B is a diagram for illustrating an image which is recorded on the recording medium 106 after performing the HS process to the image data of the solid image recorded with the ink of 50% duty from the right four nozzles. In FIG. 9B, a dot 10611 is recorded by the ink ejected from the nozzle 10111 and a dot 10621 is recorded by the ink ejected from the nozzle 10121. As an example, it is assumed that an area of the dots of the ink ejected from the right four nozzles 10121 to 10124 on the recording medium is twice as large as an area of the dots of the ink ejected from the left four nozzles 10111 to 10114 on the recording medium. In this case, covered areas to the recording medium may become substantially the same by the HS process described above by reducing the number of ejection from the right four nozzles 10121 to 10124 to about half the number of the ejection of the left four nozzles 10111 to 10114 (i.e., 2 dots to 1 dot). In this manner, in the HS process, the number of dots recorded in each area is adjusted so that the density detected in each area on the recording medium becomes substantially uniform. Although the covered area and the detected density are not necessarily in a proportional relationship actually, the present embodiment describes an example in which half a number of dots of twice as large as an area are used.

As described above, in the HS process, the number of dots to be recorded is adjusted so that the covered area in an area 1061 equals to the covered area in an area 1062. Therefore, if the density observed due to the light absorption characteristics of the area 1061 equals to the density observed due to the light absorption characteristics of the area 1062, densities of both the areas appear to be substantially the same in color.

Such variation in ejection characteristics may be caused in a multi-valued recording apparatus in which dot size may be changed, e.g., a 4-valued recording apparatus which performs recording with three-sized dots: large, medium and small. Therefore, the present invention is applicable not only to a binary recording apparatus but to a multi-valued, i.e., 3-valued or greater, recording apparatus.

In the first embodiment, the TRC process and the quantization process are performed to the photograph image data and to the character image data separately. However, since the two kinds of image data are composed together after the ink color conversion in the present embodiment, the TRC process and the quantization process may be performed at once. In addition, the HS process described above may be performed before the TRC process.

If the TRC process and the quantization process to be performed to the photograph image data and to the character image data are the same, it is only necessary to perform each of these processes after the composition of the two kinds of data is completed.

Next, a process flow of the present embodiment will be described.

Processes from the photograph-ink color converting unit 306 to the character ink color converting unit 310 performed in the printer 100 are the same as those in the first embodiment. In the present embodiment, after the ink color conversion of the two kinds of image data is performed, the two kinds of image data are composed together in an ink color data composing unit 501. Next, the composed image data undergoes processes in the HS processing unit 502, a TRC processing unit 503 and a quantization processing unit 504 to create printing data. The printing data is sent to the binary data printing unit 314 as in the first embodiment and is printed.

The HS processing unit 502 inputs image data of an ink color signal and performs a process to convert 8-bit data, for each ink color, into image data of an ink color signal in accordance with the ejection amount of each nozzle which constitutes the recording head.

First, a method for determining an ejection amount in the HS process will be described. Determination of the ejection amount is to determine the size of the ink dot ejected from the nozzle. With the determination result, a 1D look-up table in the HS process is determined and the number of dots on the recording medium for each ink is finally determined. The ejection amount is also used as a parameter for performing switching determination of the quantization process.

The HS process is a process to convert, for each unit area in a recording area on the recording medium, image data corresponding to a nozzle which performs recording in each unit area using a conversion table. With this process, a difference in density between unit areas resulting from variation in ejection amount of the nozzles may be reduced. In order to perform this HS process, it is necessary to generate a conversion table for each data corresponding to a nozzle group corresponding to the unit area. When the conversion table is generated, it is necessary that correspondence between each unit area and each nozzle has already been determined. That is, it is necessary that correspondence between each unit area of the recording area on the recording medium and the nozzle has been allocated before the HS process is performed.

FIG. 10 is a flowchart illustrating each process performed by the CPU 211 in order to generate a parameter of the conversion table used in the HS processing unit 502 of the present embodiment. In the present embodiment, such a parameter generation process is performed compulsorily or selectively when the printer is manufactured, when the printer is used for a predetermined period of time, or a predetermined amount of recording has done. Alternatively, for example, the parameter generation process may be performed before each recording event. That is, the process may be performed for a calibration purpose and, thereby, a table parameter which is the content of the conversion table is updated.

When a table parameter generation process in the HS processing unit 502 is started, first, in step 1002, the ink is ejected from all the nozzles of each of the recording heads illustrated in FIG. 1 and an image for measurement is recorded on the recording medium. In this case, the image for measurement in which signal value for each of K, C, M and Y is defined as 0 or 255 is used. For example, in the image for measurement for measuring the density of cyan ink, the signal values may be defined as (K, C, M, Y)=(0, 255, 0, 0) and, in the image for measurement for measuring the density of magenta ink, the signal values may be defined as (K, C, M, Y)=(0, 0, 255, 0).

Figure 5:
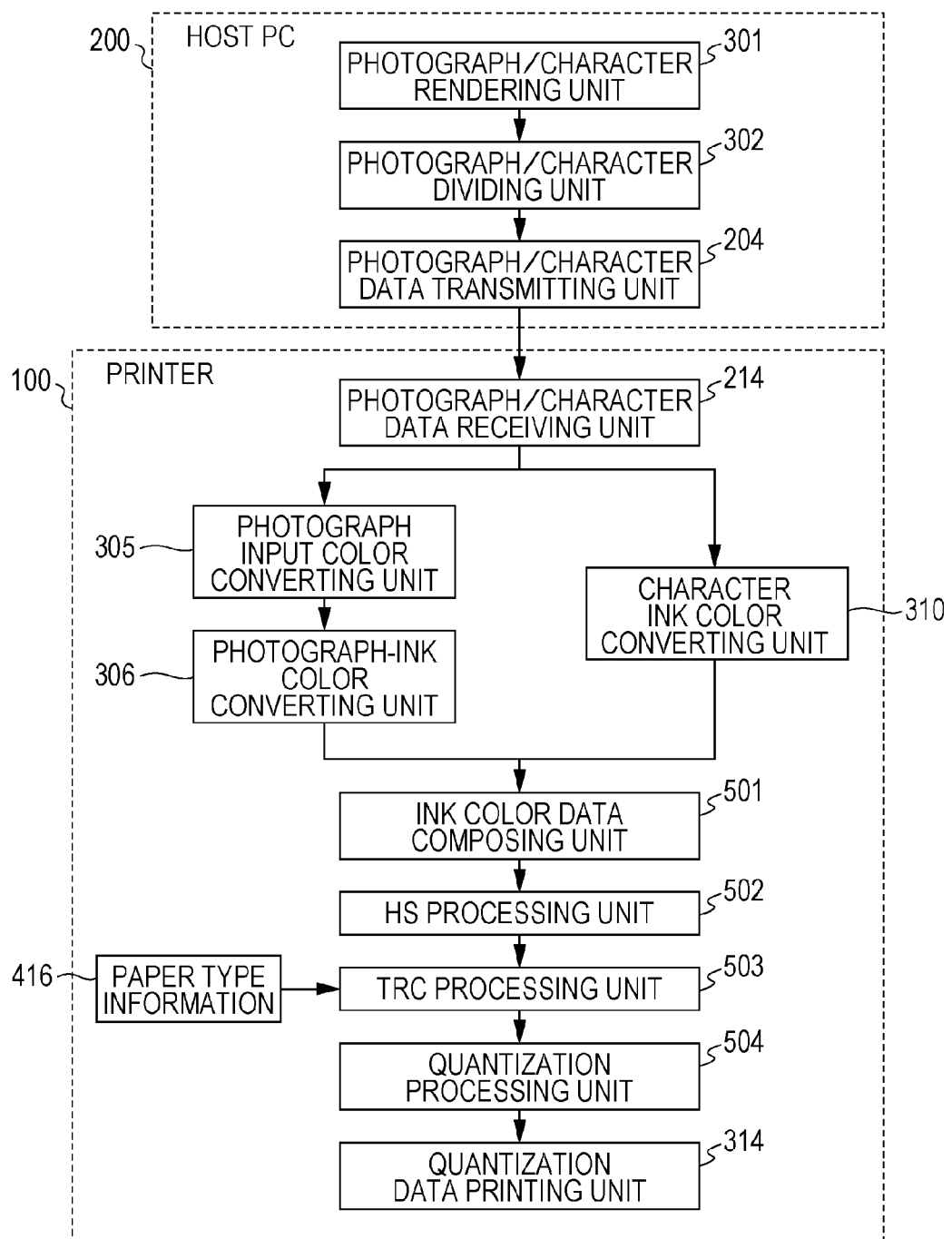
FIG. 5 is a block diagram illustrating a recording system in which data composition of a photograph and characters is performed after a process of an ink color converting unit in an embodiment of the present invention.
Figure 6:
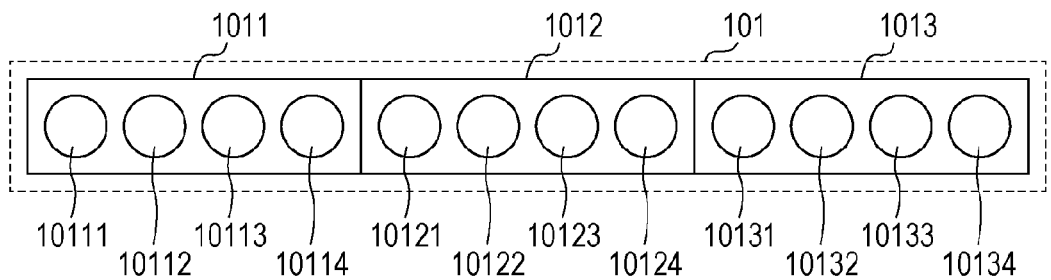
FIG. 6 is a diagram illustrating a configuration of a recording head of an embodiment applicable to the present invention.

Hereinafter, a method for recording the image for measurement will be described in corresponding to FIG. 5. When the image for measurement is recorded, image data (R, G, B) is input in the photograph-ink color converting unit 306 without undergoing the process of the photograph input color converting unit 305 (hereafter, referred to as a "device color image data D[X]"). Such a path is illustrated by a broken line 315 as a bypass in FIG. 3. For the process through the bypass, a table with which, for example, an input value equals to an output value is prepared and the device color image data D[X] is input in the photograph-ink color converting unit 306. However, a process may be performed with which the input value may be output directly regardless of a value of X.

Then, the same processes which are performed to normal data are performed in the HS processing unit 502, the TRC processing unit 503 and the quantization processing unit 504 and the image for measurement is recorded on the recording medium 106 in the binary data printing unit 314. In this process, the image data of the image for measurement represented by (R, G, B) is converted into the image data (K, C, M, Y) in accordance with the color signals of the ink in the photograph-ink color converting unit 306. In this case, if the image data of the image for measurement is (R, G, B)=(0, 255, 255), for example, the signal values are converted into image data of (K, C, M, Y)=(0, 255, 0, 0), i.e., the data with which 100% of cyan ink is recorded. Then, the image data of (K, C, M, Y)=(0, 255, 0, 0) is recorded as dot data illustrated in FIG. 8B by the processes in the HS processing unit 502 and thereafter.

Figure 11A:
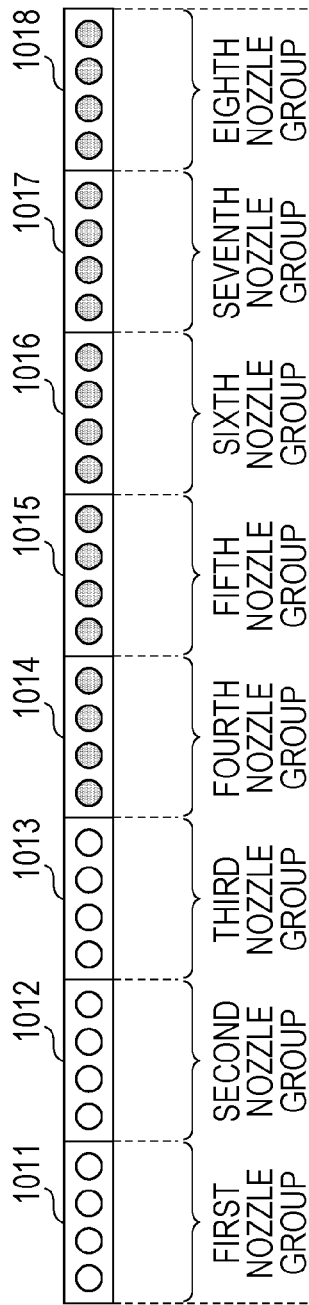
FIGS. 11A and 11B are diagrams illustrating a nozzle group in a recording head and an area record by the nozzle group.

Here, X is the information representing the position of the nozzle of each color in an x direction per four nozzles in the recording heads 101 to 104 illustrated by FIG. 1. In the HS process of the present embodiment, processes are performed for a unit of one nozzle group constituted by four nozzles among a plurality of nozzles, and image data corresponding to each nozzle group is corrected for each unit of the nozzle group. The device color image data D[X] is the image data to be recorded by four nozzles corresponding to X of each ink color. The state is illustrated in FIG. 11A. For the ease of illustration, a recording head in which nozzle groups constituted by four nozzles are arranged is illustrated. A 1D look-up table for performing the HS process is allocated to each of these nozzle groups.

Figure 11B:
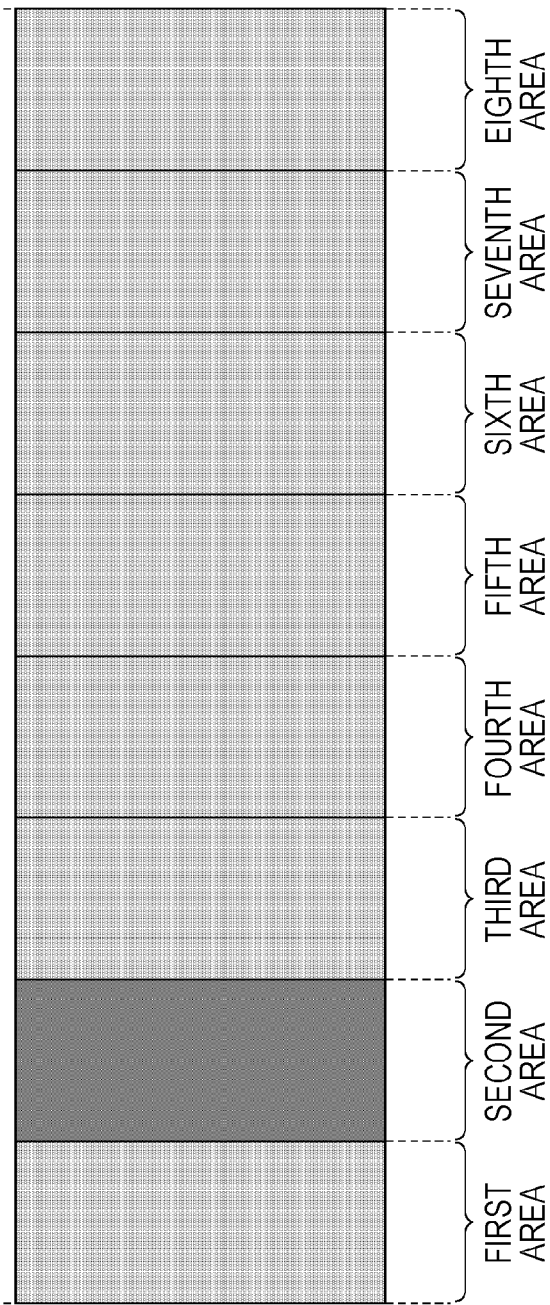

FIG. 11B is a diagram for illustrating a recorded state of the image for measurement in step 1002 described above. FIG. 11B illustrates that, among the nozzles of the recording head 101 which eject the ink, four nozzles corresponding to a second area have an ejection amount greater than a standard amount. Therefore, a difference in density occurs in the second area in which the nozzles having an ejection amount greater than a standard amount are included and, as a result, an image for measurement in which density is different from that of other areas is recorded.

FIG. 10 will be referred to again. In step 1003, the image for measurement recorded on the recording medium 106 in step 1002 is measured using a scanner 107 and density information B[X] corresponding to each area [X] is obtained. In the present embodiment, the resolution of the scanner, i.e., an arrangement pitch of reading elements arranged in the scanner is not particularly limited. The resolution of the scanner may be higher or lower than the resolution of the recording resolution 1200 dpi of the recording head. The scanner 107 is not necessarily a full line type scanner like the recording head illustrated in FIG. 1: the scanner 107 may also be a serial type scanner which measures color at predetermined cycles while moving in the x direction as illustrated in FIG. 1. Alternatively, the scanner may be provided separately from the printer. In this case, for example, a signal connection may be established between the scanner and the printer and the measurement result may be automatically input from scanner. The density information B[X] is not necessarily to be RGB information and, for example, may take any form, such as L*a*b* which is measured by a colorimeter. The color measurement may be performed by any form and at any resolution: if the B[X] of an area corresponding to four nozzles is obtained properly by performing various processes including averaging, the density information B[X] may be applied to the present embodiment. In this manner, the device color image data D[X] is recorded on the recording medium as the image for measurement and is recorded by the recording head 101 illustrated in FIG. 1. Then, the density information B[X] is obtained by the scanner 107 for each area (unit area) corresponding to each nozzle group (four nozzles the present embodiment). Here, the recording head 101 is the recording head which ejects the K ink. If the device color image data D[X] is defined as (K, C, M, Y)=(255, 0, 0, 0), only the K ink is ejected on the image for measurement.

Hereinafter, description will be continued with the first area being X=1, the second area being X=2, the density information of the first area being B[1]=(R1, G1, B1) and the density information of the second area being B[2]=(R2, G2, B2).

In step 1004, density variation amount T[X] of each area [X] is calculated on the basis of target density A=(Rt, Gt, Bt) and density information B[X] obtained in step 1003. Here, the target density A is, in a case of the K ink, for example, a target colorimetric value of a signal of (K, C, M, Y)=(255, 0, 0, 0) which is recorded using the printer of the present embodiment and is measured. Actually, the target density A may be a color measurement result obtained by scanning, by the scanner 107, the image recorded using the nozzles having a standard ejection amount.

First, a difference between the density information B[X] and the target density A is set to a density difference amount S[X] and the value thereof is calculated.

Density difference amount $S[1]=B[1]-A=(R1-Rt, G1-Gt, B1-Bt)$

Density difference amount $S[2]=B[2]-A=(R2-Rt, G2-Gt, B2-Bt)$

In this example, since the K ink is ejected at a standard ejection amount in the first area, basically, R1=Rt, G1=Gt and B1=Bt and the density difference amount is S[1]=0. In the second area, since the K ink is ejected at an ejection amount greater than a standard amount, a value which is smaller (higher density) than the target density A (Rt, Gt, Bt) is detected. Next, density variation amount T is obtained on the basis of this density difference amount S. The density variation amount T expresses a relative variation amount of ejection amount in comparison with the target density (i.e., the standard ejection amount), and is represented by a ratio of increase and decrease from the standard ejection amount.

Figure 12:
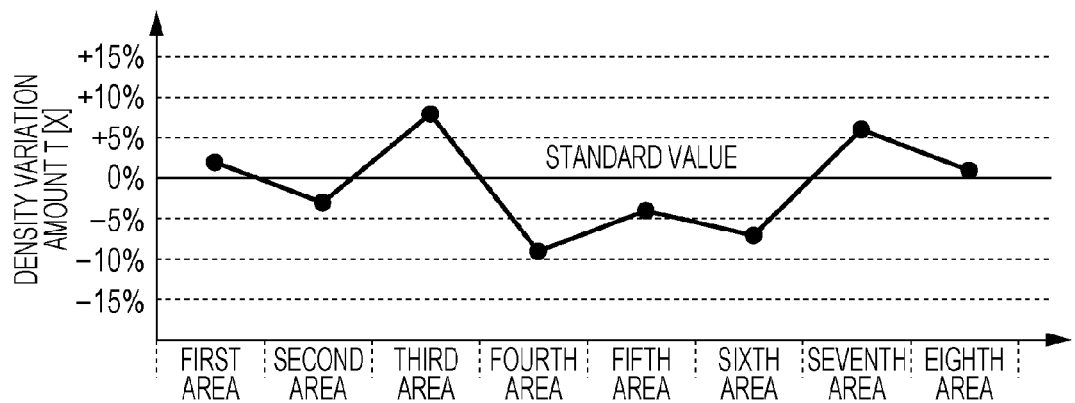
FIG. 12 is a graph illustrating a difference in density from a standard ejection amount in each nozzle group in each area.

FIG. 12 illustrates a relationship between the density variation amount T[X] and each area [X]. The density variation amount T may be calculated by table determination using previously prepared table data of a relationship between the density difference amount S and the density variation amount T or may be obtained functionally by, for example dividing the density difference amount S[X] by the target density A.

Figure 13:
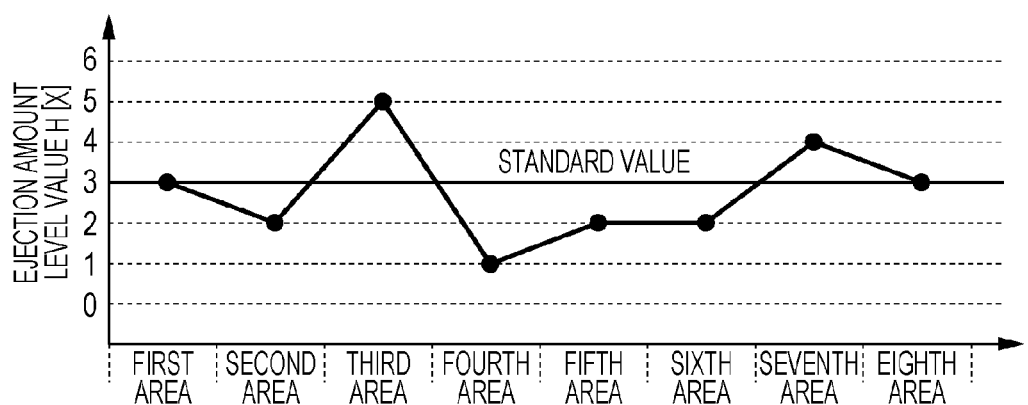
FIG. 13 is a graph illustrating an ejection amount level value calculated from a difference in density in each nozzle group in each area.

FIG. 10 will be referred to again. In step 1005, ejection amount level value H[X] is determined from the density variation amount T[X] of each area [X]. In the present embodiment, the density variation amount T[X] is simply determined by threshold decision and the ejection amount level value H[X] is determined in accordance with the result. A plurality of 1D look-up tables in accordance with the ejection amounts are stored previously in the HDD 203 of the host PC 200 and a 1D look-up table to be applied is determined for each area in accordance with the determination result of the ejection amount level value H[X]. A relationship between the ejection amount level value H[X] and each area [X] is illustrated in FIG. 13. For example, an ejection amount level value in FIG. 13 is 3 in an area [8] in which ejection amount is +2% compared with the standard ejection amount in FIG. 12. Then, a process to apply the third 1D look-up table stored in the HDD 203 to the area [8] is performed. Note that the method of determining the 1D look-up table for each area in accordance with the density variation amount T[X] is not limited to the threshold decision described above: the 1D look-up table may be dynamically created in accordance with the density variation amount T[X].

In step 1006, an HS table parameter used by the HS processing unit 502 is created from the 1D look-up table for each area determined in accordance with the ejection amount level value H[X] of each area [X], and the created HS table parameter is set in the RAM 212. In step 1007, by applying the thus-obtained HS table parameter to the device color image data D[X], correction device color image data D'[X] is created. Then, in step 1008, the same processes which are performed to normal data are performed to this image data in the TRC processing unit 503 and the quantization processing unit 504 and the image for measurement is recorded on the recording medium 106 in the binary data printing unit 314. In this manner, a recorded image with uniform density may be obtained at each area [X]. Although the 1D look-up table is provided for every four nozzles in the present embodiment, the number of nozzles is not limited. The determination result of the ejection amount of the entire recording head is stored in the HDD 203 of the host PC 200. The determination result is used as a parameter to be referred to when switching the quantization process.

Figure 9A:
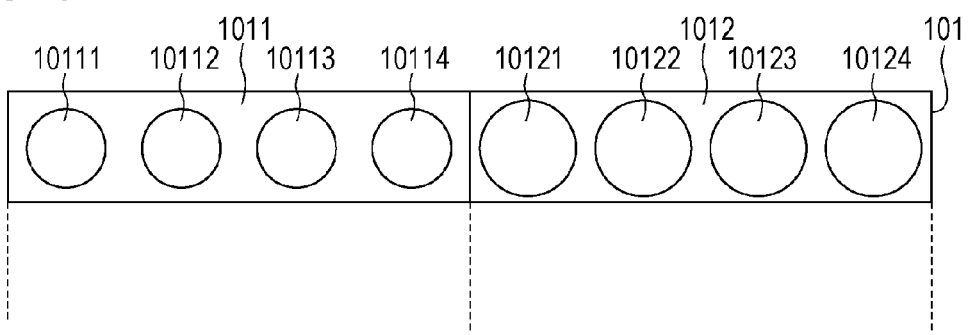
FIGS. 9A and 9B are diagrams illustrating dot arrangement patterns with a head shading (HS) process being performed to the recording head illustrated in FIG. 6.
Figure 9B:
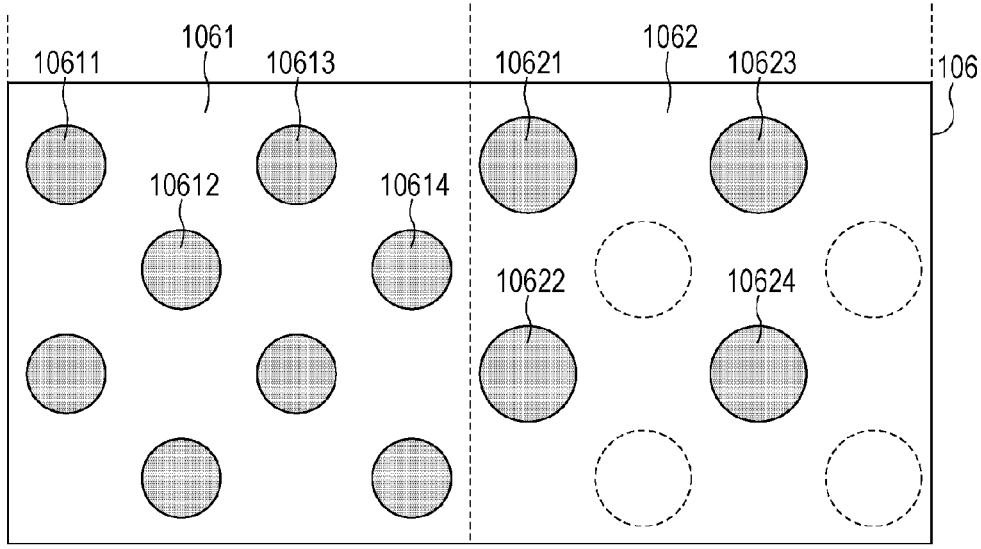

As described above, in the HS process, a parameter to reduce the number of dots to about the half is created as illustrated in the area of 1062 of FIG. 9B regarding the nozzles 10121 to 10124 of the recording head 101 illustrated in FIG. 9A. Regarding the nozzles 10111 to 10114 of the recording head 101, as illustrated in the area 1061 of FIG. 9B, a parameter not to change the number of dots is created. That is, the higher the ejection amount level value as compared with the standard value, the smaller the number of dots recorded on the recording medium. The smaller the ejection amount level value as compared with the standard value, the greater the number of dots recorded on the recording medium.

As described above, the number of dots is controlled by performing the HS process in each area [X]. In this manner, the density of each area [X] may be made substantially uniform. Unevenness in the density has been noticeable on a printed matter which is printed on a paper sheet uniformly, such as a photograph. For this reason, the HS process has been used in a printing system related to photographic images. However, it is also useful to perform the HS process in the character image data which requires a smaller area to eject ink on the paper sheet as compared with a photograph. For example, when a document image or the like in which text is written with bold or large characters is printed, if the recording head of the K ink has unevenness in the density, the density may differ among each of the characters and unevenness in the density may become visible in the entire paper sheet. When an image is printed so that characters are printed on the entire paper sheet, unevenness in the density may become visible in the same manner as the unevenness in the density occurs in the photographic image. Therefore, in the present embodiment, high-quality printing may be provided by performing the HS process not only to the photograph image data but to the character image data.

When the number of dots is adjusted in the TRC processing unit 503, the ink applying amount is determined on the basis of the paper type information 416 in the same manner as in the first embodiment and the process is performed.

In the quantization process, it is possible to quantize while distributing errors to other pixels as in the error diffusion process and, therefore, high-quality image may be obtained. Further, since the quantization process is performed only once, a circuit size may be reduced in a hardware process and the process speed may be increased in a software process.

The ink color data composing unit 501 may perform the process after the TRC processing unit 503 performs. In that case, the photograph image data having undergone the processes of the photograph TRC processing unit 307 and the character image data having undergone the processes of the character TRC processing unit 311 are composed in the ink color data composing unit 501 and the composed data is sent to the quantization processing unit 504. At that time, as in the first embodiment, the processes are performed in the photograph TRC processing unit 307 and in the character TRC processing unit 311 in accordance with the paper type information. The HS process 502 may be performed after the data is processed in the TRC processing unit 503. As described in the first embodiment, the process in accordance with the paper type information may be performed in the photograph-ink color converting unit 306 and in the character ink color converting unit 310.

With the configuration of the second embodiment, the ink color data composing unit performs the process after the ink color converting unit performs and, therefore, it is necessary to perform the HS process, the TRC process and the quantization process only once. Therefore, in addition to the effect of the first embodiment, there is an effect that the process load is reduced.

Third Embodiment

In the first embodiment, the photograph image data and the character image data which have been divided are transferred separately to the printer 100 in an uncompressed condition. In this case, load is applied to the transmission process: thus, the two kinds of image data are compressed in the host PC 200 and transferred in the present embodiment.

Figure 14:
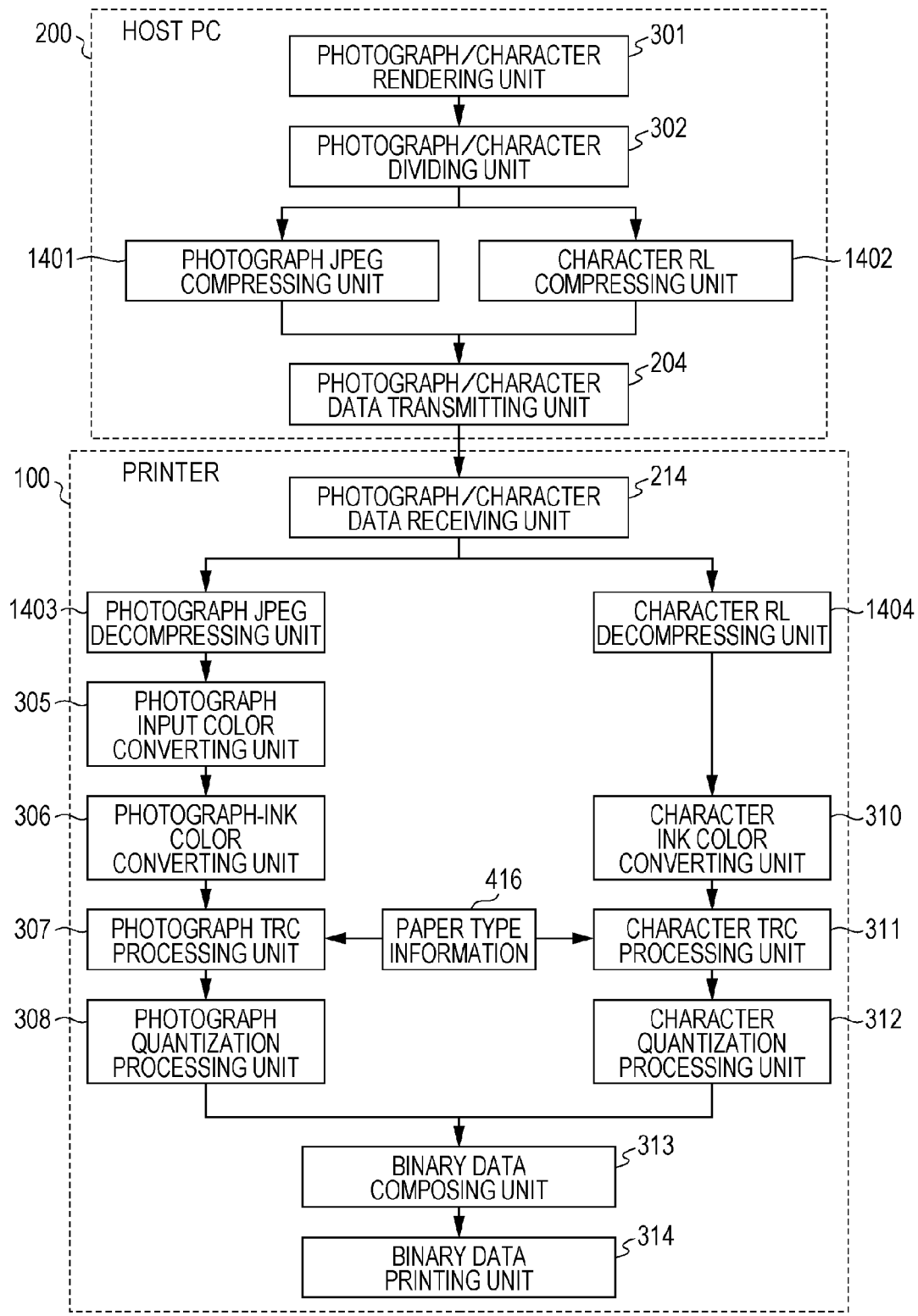
FIG. 14 is a block diagram illustrating a recording system which compresses data of a photograph and characters and transfers the same to a printer in an embodiment of the present invention.

The process flow will be described with reference to FIG. 14. The photograph image data divided in the photograph/character dividing unit 302 is compressed into JPEG data in the photograph JPEG compressing unit 1401. The character image data undergoes RUNLENGTH data compression in a character RL compressing unit 1402. In a photograph/character compressed data transmitting unit 204, two kinds of compressed image data are transferred to the printer 100. In that case, the two kinds of compressed image data may be transferred separately or may be transferred in a composed manner. Alternatively, one of the two kinds of image data may be transferred in a compressed condition and the other may be transferred in an uncompressed condition.

Next, the compressed image data is received in the photograph/character compressed data receiving unit 214 of the printer 100. The received image data is divided into photograph image data and character image data, and are sent to a photograph JPEG decompressing unit 1403 and a character RL decompressing unit 1404, respectively. The photograph image data and the character image data are decompressed here, and after that, as in the first embodiment, the photograph image data is sent to the photograph input ink color converting unit 305 through the photograph input color converting unit 306 and the character image data is sent to the character ink color converting unit. The photograph image data and the character image data are processed in the respective TRC processing unit and the respective quantization processing unit and then two kinds of binary data are composed in the binary data composing unit 313. Finally, the binary data is sent to the binary data printing unit 314 for printing.

The above-described processes are performed in the same process flow as in the second embodiment. Image data is composed in the ink color data composing unit after the photographic image data and the character image data undergoes processes in the respective input color converting unit and respective ink color converting unit. Then, the image data is converted into printing data after undergoing processes in the TRC processing unit and the quantization processing unit. The printing data may be sent to the binary data printing unit for printing.

In this manner, transfer load may be reduced by compressing the photograph/character image data by the I/F between the host PC 200 and the printer 100. In the present embodiment, JPEG compression is applied to the photograph image data, but the compression method is not particularly limited. Other lossy compression methods may be used. By applying the lossy compression to the photograph image data, the data volume may be reduced more significantly than when lossless compression is applied. Other lossless compression methods than RUNLENGTH compression may be applied to the character image data. It is necessary for the character image data to reproduce details and, if lossy compression is performed especially to small characters, characters may be garbled at the time of decompression. Therefore, it is necessary to perform lossless compression to the character image data. In the present embodiment, data volume may be significantly reduced by the compression in consideration that the character image data is binary data or 1-channel monochrome data.

The character image data is not limited to 1-channel monochrome data: it is only necessary that the character image data includes dot existence information which represents whether the data is a character.

Since the character image data is the dot existence information which represents whether the data is a character, the character image data is suitable for compression. By performing compression, the data volume may be reduced significantly, and the effects described in the first and second embodiments may be obtained.

Fourth Embodiment

Figure 15:
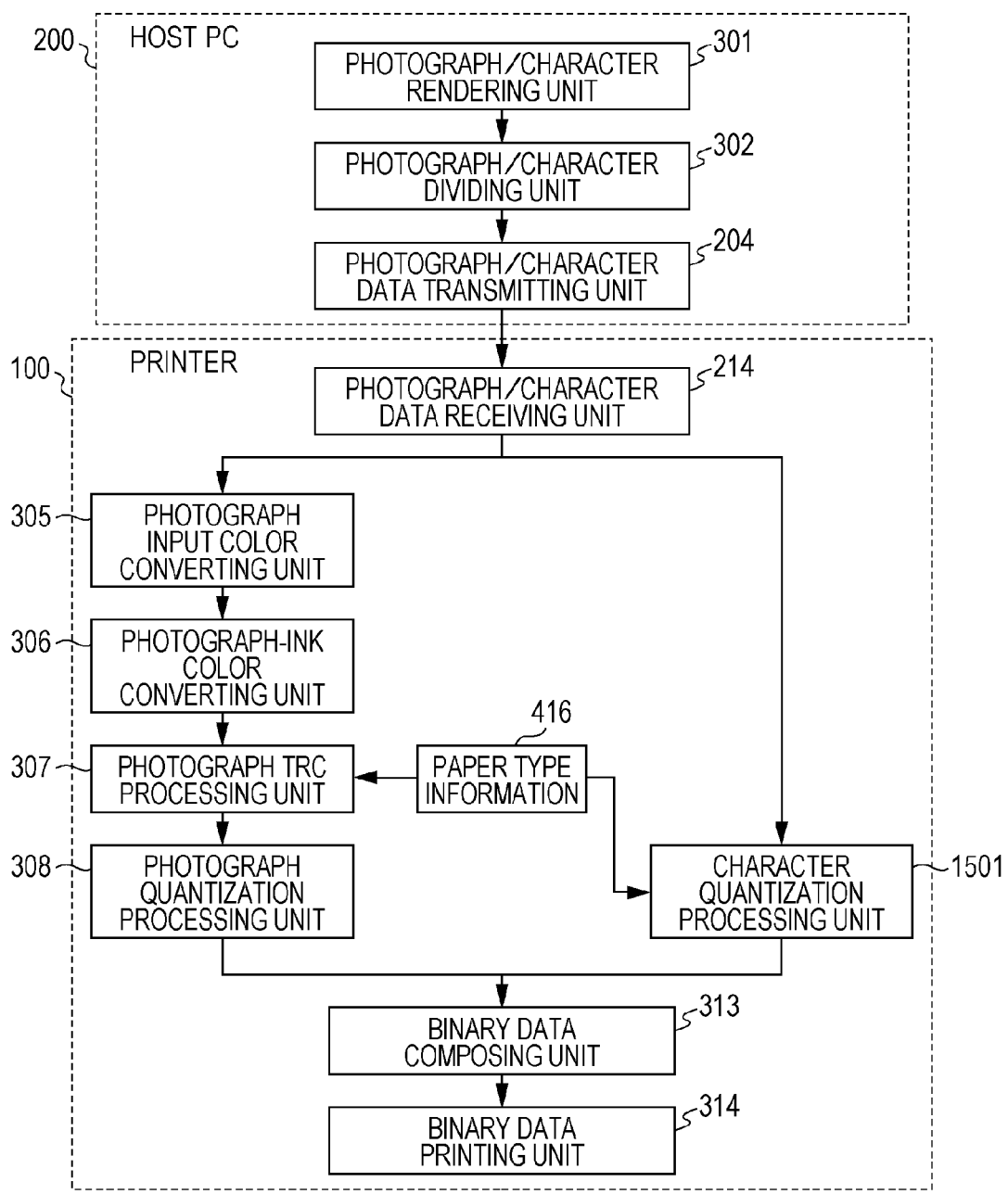
FIG. 15 is a block diagram illustrating a recording system in which character data is directly quantized after image data is received in an embodiment of the present invention.

A fourth embodiment will be described with reference to FIG. 15. In the first embodiment, the ink color conversion process and the TRC process are performed to the character image data. In the present embodiment, only the quantization process in consideration of the paper type information is performed to the received binary data or the character image data of the 1-channel monochrome data.

In the photograph image data, as in the first embodiment, processes until the quantization process are performed and the photographic image printing data is created. Regarding the character image data, a quantization process is performed to the received image data with the paper type information 416 being considered in the character quantization processing unit 1501. For example, it is assumed that the character image data is binary data and that the paper type rank is held as paper type information.

In that case, the black pixel (K)=(1) is exchanged with (K)=(X) depending on the paper type rank.

For example, if the rank is 255 in paper A, X=255; and if the rank is 160 in paper B, X=160. A black pixel value in accordance with this paper type rank is calculated and a quantization process is performed using the calculated value as an input value. At this time, the quantization process is not particularly limited and, for example, a dither method, an error diffusion method and a density pattern method may be used as needed. Other methods may also be used.

A quantization process when the quantization process is a dither process will be described with reference to FIG. 16.

The input value (i.e., the signal value of the input image) is 0 to 255 and the output values are five values of 0 to 4. The quantization representative threshold value is set to (0, 63, 127, 191, 255).

In the quantization process, the quantization representative threshold value is compared with the input value and the output rank is determined. As illustrated in FIG. 16, the output rank is set to 0 when the input value is equal to or greater than 0 and equal to or smaller than 63, the output rank is set to 1 when the input value is equal to or greater than 64 and equal to or smaller than 127, the output rank is set to 2 when the input value is equal to or greater than 128 and equal to or smaller than 191, and the output rank is set to 3 when the input value is equal to or greater than 192 and equal to or smaller than 255.

Then, using the difference between the lower one of the quantization representative values of output rank and the signal value, normalization into bit precision equivalent to the dither mask threshold value is performed. The value is set to the input value α and is compared with the threshold value of the dither mask.

In FIG. 16, the input value is 160 and, in this case, since the input value is equal to or greater than 128 and equal to or smaller than 191, the output rank is set to 2. A quantization representative threshold limit which defines the lower limit of the output rank 2 is 127 and the difference from the input value is 160−127=33.

The difference 33 is normalized to the size of the dither threshold from the gap (i.e., gap between the threshold value 191 and 127 which define the output rank 2) of the quantization representative threshold value, and the input value α is set to 33/64*256=132.

Then, the threshold value 228 and the input value α of the dither mask at the pixel position in the input image are compared with each other. In the present embodiment, if the input value α is equal to or greater than the dither threshold of the corresponding pixel, the number of the output rank is incremented by 1 and the obtained value is set to the output value.

In the example illustrated in FIG. 16, the dither mask threshold value is 228 with respect to the input value α=132, the output rank is not incremented and the output value is still 2. As for the pixel to the right next to that pixel, the input value of the image data is 160 and the input value α is 132, but since the threshold value of the corresponding pixel of the dither mask is 132 and the input value α is equal to or greater than the threshold value, the output rank is incremented by 2 and the output value is set to 3.

Here, an example in which binary data of the character image as illustrated in FIG. 17A is quantized using a dither mask as illustrated in FIG. 17B will be described.
The quantization representative threshold value as illustrated in FIG. 16 is used.

In the paper type is the paper A described above, a character quantization processing unit 1501 converts each pixel of (K)= (1) into (K)=255 and the input value is set to 255. Here, when the quantization representative threshold value illustrated in FIG. 16 and the input value are compared in the manner described above, the output rank is set to 3. The input value α is obtained by using the value 255−191=64 which is the difference between the input value and the quantization representative threshold value and the value is normalized such that the input value α=64/64*255=255. Then, the dither threshold in each pixel and the input value α of each pixel (=255) are compared and, if the dither threshold is equal to or smaller than the input value α, the output rank 3 is incremented by 1 and the output rank 4 is calculated as the output value. The output result is illustrated in FIG. 17C.

As for the paper B, the value of each pixel of (K)=(1) is converted as the black pixel (K)=160, the input value is 160 about each pixel. The input value α is set to 132 and the output rank is set to 2. The input value α is compared with the dither threshold of each pixel and the output result is illustrated in FIG. 17D.

Then, the obtained multi-valued data (c) and (d) may be converted into binary data at in accordance with the output resolution and a nozzle structure of the apparatus.

Although the dither method with multi-valued output has been described in the example, a dither method with binary output may also be used: the printing density may be adjusted by setting the paper rank to a 1-bit input value.

In this manner, the character image printing data is created, the photographic image printing data and the character image printing data are composed and composed printing data is created in the binary data composing unit 313.

Therefore, regarding the character image data, compared with the first embodiment, since the ink color converting unit and the TRC processing units are eliminated, process load of the character image data processing unit is reduced and the process speed may be increased. At the same time, the same effect as that of the first embodiment may be obtained.

In the present embodiment, image may be transferred in a compressed manner in the same manner as in the third embodiment.

Fifth Embodiment

Figure 18:
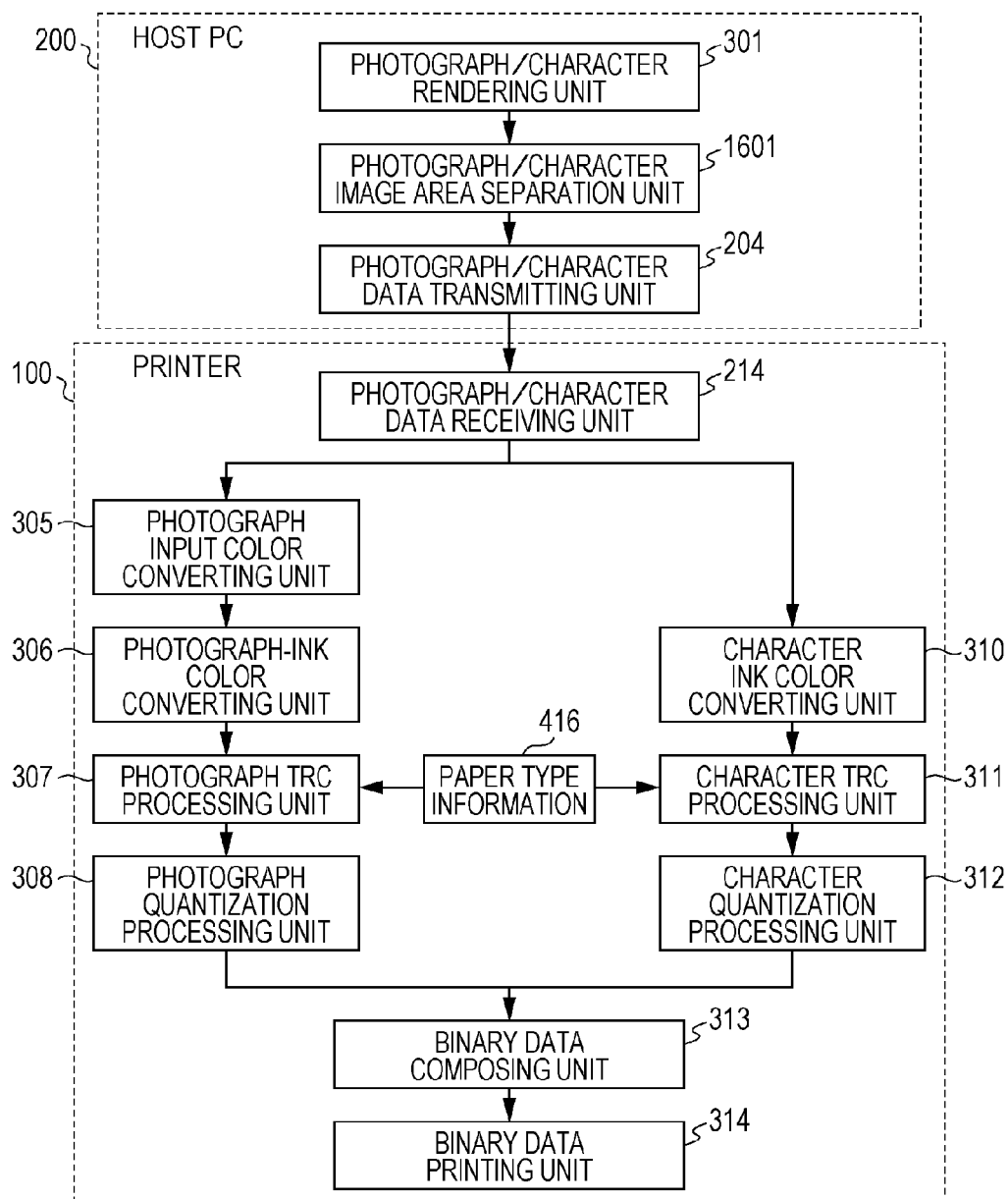
FIG. 18 is a block diagram illustrating a recording system which divides data of a photograph and characters in an image area dividing process in an embodiment of the present invention.

In the first embodiment, image data in which the photograph image data and the character image data have been divided previously is used as the input image data. In the present embodiment, image data in which a photograph part and a character part exist together will be described. For example, the image data used in the fifth embodiment is image data obtained upon reading, using a reader, such as a scanner, a document in which a photograph and characters exist together. Alternatively, a PDF file after composing photograph image data and character image data into a single layer may also be used. The process flow diagram is illustrated in FIG. 18. Image area division of the input image data which has been rendered in the photograph/character rendering unit 301 of the host PC 200 is performed by a photograph/character image area dividing unit 1601.

This image area dividing process may be a generally known process. For example, a method of dividing into the photograph part and the character part on the basis of, for example, edge quantity of the input image data and pixel signal values. In this method, it is determined whether the edge quantity is equal to or greater than a predetermined threshold value by applying an edge extracting filter for each pixel regarding the input image data. Then, it is determined whether the RGB signal value of the pixel is equal to or smaller than a predetermined threshold value. If the edge quantity is equal to or greater than the threshold value and the RGB signal value is equal to or smaller than the threshold value, it may be determined that the pixel is a black character with high edge. Other pixels are determined to be photograph part. In the first to fourth embodiments, the character image data has been divided previously and made to undergo the input color conversion, the ink color conversion, the TRC process and the quantization process without other processing. In the present embodiment, by changing the determination threshold value of the image area separation process, the process may be changed each time in cases, for example, in which only black characters are processed as character image data or in which both the black characters and color characters are processed as character image data.

Since the configuration of the present embodiment is implemented in the host PC, an amount of information included in the character image data, such as the edge, may be increased and a change of the process becomes easy in cases, for example, in which only black characters are processed as character image data or in which both the black characters and color characters are processed as character image data. By adding the configuration of the present embodiment to the configurations described in the first to the fourth embodiments, the effects of the first to the fourth embodiments may be obtained.

By using the image processing apparatus and method of the present invention, the ejection amount may be adjusted and high-quality recording may be performed.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-065665 filed Mar. 22, 2012, which is hereby incorporated by reference herein in its entirety.

What is claimed is:

1. An image processing apparatus to generate dot data to form an image by forming dots on a recording medium, the image processing apparatus comprising:
- a receiving unit configured to receive first image data and character image data included in data of the image and divided from each other so that each may undergo separate process flows, wherein the first image data represents a tone value of a tone of the image of a first image attribute and the character image data represents a tone of the image of a character attribute by binary tone values;
- a first generating unit configured to generate, in accordance with the first image data received by the receiving unit, first ink color data representing a multi-valued signal value corresponding to a color of ink to be used to form an image corresponding to the first image data on the recording medium;
- a second generating unit configured to generate, in accordance with the character image data received by the receiving unit and in a process separate from process performed by the first generating unit, second ink color data representing a multi-valued signal value corresponding to a color of ink to be used to form an image corresponding to the character image data on the recording medium;
- a correcting unit configured to correct signal values represented by the first and second ink color data generated by the first and second generating units; and
- a third generating unit configured to generate, in accordance with the first ink color data and the second ink color data of which the signal values have been corrected by the correcting unit, composed dot data representing existence of formation of dots to form an image of a first image attribute and an image of a character attribute,
- wherein, in a case where a same first color is to be printed for both the first image data and the character image data, the first generating unit generates the first ink color data and the second generating unit generates the second ink color data such that the color of ink to be ejected onto the recording medium as the first color is changed for both the first image data and the character image data.

2. The image processing apparatus according to claim 1, wherein, by performing a quantization process by a dither method, the third generating unit generates first dot data which represents existence of formation of an ink dot in accordance with the first ink color data separately from generating second dot data which represents existence of formation of an ink dot in accordance with the second ink color data.

3. The image processing apparatus according to claim 1, wherein the first image data and the character image data represent the tone value in a form of a signal value of R, G, and B.

4. The image processing apparatus according to claim 3, wherein the first image data represents a tone value of a tone of an image by multi-valued tone values, and the character image data is image data which includes information representing the tone of an image of the character attribute and information representing a color of an image of the character attribute.

5. The image processing apparatus according to claim 1, wherein the correcting unit corrects the signal values in accordance with a type of the recording medium utilizing a conversion table having values predetermined for a plurality of paper types.

6. An image processing system, comprising:
- the image processing apparatus according to claim 5; and
- a transmitting unit configured to transmit the first image data and the character image data to the receiving unit of the image processing apparatus.

7. The image processing apparatus according to claim 5, wherein the type of the recording medium is one of a first type and a second type, wherein the first type is configured to receive a large applying amount of ink through a thick receptive layer of the medium that is thick, and the second type is configured to receive a small applying amount of ink through a thin receptive layer of the medium that is thinner than thick receptive layer.

8. The image processing apparatus according to claim 1, wherein the first image data and the character image data are specified by at least one of (i) full color image data is used as the first image data and monochrome image data is used as the character image data, (ii) the first image data is stored as bit map data and the character image data is stored as vector data, (iii) perceptual rendering intent is used as the first image data and colorimetric rendering intent is used as the character image data, and (iv) a file format in which identification information of attributes of a photograph and characters are described is created regarding image data and first image data/character image data determination is performed in accordance with the identification information.

9. The image processing apparatus according to claim 1, wherein the correcting unit is a first correcting unit configured to correct the signal value represented by the first ink color data generated by the first generating unit and a second correcting unit configured to correct the signal value represented by the second ink color data generated by the second generating unit such that that first image data of the first image data and character image data of the character image data undergo processes in separate process flows to separately perform ink color conversion, photograph tone reproduction curve (TRC) process, and quantization process.

10. The image processing apparatus according to claim 1, wherein the receiving unit receives the first image data and the character image data of lower bit than that of the first image data transmitted by a transmitting unit.

11. The image processing apparatus according to claim 1, further comprising a printing unit configured to print on the recording medium based on the composed dot data generated by the third generating unit.

12. The image processing apparatus according to claim 1, wherein, in a case where a same first color is to be printed for both the first image data and the character image data and the first color of the received first image data is constituted by all colors of a first color model, the first generating unit generates the first ink color data to be less than multiple colors of a second color model and the second generating unit generates the second ink color data such that the applying amount of ink to be ejected onto the recording medium as the first color is greater for the character image data than for the first image data.

13. The image processing apparatus according to claim 1, wherein, in a case where a same first color is to be printed for both the first image data and the character image data and the recording medium is a first type of recording medium, the second generating unit generates the second ink color data such that the applying amount of ink to be ejected onto the recording medium as the first color for the character image data is less when the recording medium is the first type of 14. The image processing apparatus according to claim 1, wherein, in a case where multiple colors are to be printed for the character image data, the second generating unit generates the second ink color data such that binary data for the character image data is held on multiple planes.

15. The image processing apparatus according to claim 1, wherein, in a case where the character image data includes an edge portion and portions other than the edge portion, the second generating unit generates the second ink color data for the edge portion that is different from the second ink color data for portions other than the edge portion such that robustness to misalignment among colors for the character image data is increased.

16. The image processing apparatus according to claim 1, wherein the correcting unit corrects the first ink color data of the first image data to a resolution that is lower than a resolution of the second ink color data of the character image data while reducing transmission and process load and maintaining the visibility of printed characters that represent the character image data.

17. The image processing apparatus according to claim 1, wherein the character image data includes dot existence information and the first image data includes information other than dot existence information.

18. The image processing apparatus according to claim 1, further comprising a quantization process unit configured to perform a quantization process.

19. The image processing apparatus according to claim 18, wherein ink color conversion by the first generating unit and the second generating unit, tone reproduction curve (TRC) processing by the correcting unit, and the quantization process by the quantization process unit are separately perform to the first image data and the character image data.

20. The image processing apparatus according to claim 18, wherein ink color conversion by the first generating unit and the second generating unit, and tone reproduction curve (TRC) processing by the correcting unit are separately perform to the first image data and the character image data and the first image data and the character image data are composed before the quantization process by the quantization process unit.

21. The image processing apparatus according to claim 18, wherein ink color conversion by the first generating unit is separately perform to the first image data and the character image data and the first image data and the character image data are composed after the ink color conversion by the first generating unit, before the tone reproduction curve (TRC) processing by the correcting unit such that the tone reproduction curve (TRC) processing by the correcting unit and the quantization process by the quantization process unit are performed at once.

22. The image processing apparatus according to claim 18, wherein the correcting unit corrects the signal values represented by the first ink color data in accordance with a type of the recording medium and the quantization process unit performs quantization processing to the character image data in accordance with a type of the recording medium.

23. The image processing apparatus according to claim 1, further comprising a decompressing unit configured to decompress the first image data and the character image data received from the receiving unit.

24. An image processing method for an image processing apparatus to generate dot data to form an image by forming dots on a recording medium, the image processing method comprising:

receiving first image data and character image data included in data of the image and divided from each other so that each may undergo separate process flows, wherein the first image data represents a tone value of a tone of the image of a first image attribute and the character image data represents a tone of the image of a character attribute by binary tone values;

first generating, using a central processing unit and in accordance with the first image data received by the receiving unit, first ink color data representing a multi-valued signal value corresponding to a color of ink to be used to form an image corresponding to the first image data on the recording medium;

second generating, in accordance with the character image data received by the receiving unit and in a process separate from process performed by the first generating, second ink color data representing a multi-valued signal value corresponding to a color of ink to be used to form an image corresponding to the character image data on the recording medium;

correcting signal values represented by the first and second ink color data generated by the first and second generating; and third generating, in accordance with the first ink color data and the second ink color data of which the signal values have been corrected, composed dot data representing existence of formation of dots to form an image of a first image attribute and an image of a character attribute, wherein, in a case where a same first color is to be printed for both the first image data and the character image data, the first generating generates the first ink color data and the second generating generates the second ink color data such that the color of ink to be ejected onto the recording medium as the first color is changed for both the first image data and the character image data.

25. The image processing method according to claim 24, wherein, by performing a quantization process by a dither method, third generating includes generating first dot data which represents existence of formation of an ink dot in accordance with the first ink color data separately from generating second dot data which represents existence of formation of an ink dot in accordance with the second ink color data.

26. The image processing method according to claim 24, wherein the first image data and the character image data represent the tone value in a form of a signal value of R, G, and B.

27. The image processing method according to claim 26, wherein the first image data represents a tone value of a tone of an image by multi-valued tone values, and the character image data is image data which includes information representing the tone of an image of the character attribute and information representing a color of an image of the character attribute.

28. The image processing method according to claim 24, wherein correcting includes correcting the signal values in accordance with a type of the recording medium utilizing a conversion table having values predetermined for a plurality of paper types.

29. A non-transitory computer-readable storage medium storing a program causing an image processing apparatus to perform the image processing method according to claim 24.

30. The image processing method according to claim 24, wherein receiving includes receiving the first image data and the character image data of lower bit than that of the first image data transmitted by a transmitting unit.

31. An image processing system to generate dot data to form an image by forming dots on a recording medium, the image processing system comprising:
- a transmitting unit configured to transmit first image data and character image data included in data of the image and divided from each other so that each may undergo separate process flows, wherein the first image data represents a tone value of a tone of the image of a first image attribute and the character image data represents a tone of the image of a character attribute by binary tone values;
- a receiving unit configured to receive the first image data and the character image data transmitted by the transmitting unit;
- a first generating unit configured to generate, in accordance with the first image data received by the receiving unit, first ink color data representing a multi-valued signal value corresponding to a color of ink to be used to form an image corresponding to the first image data on the recording medium;
- a second generating unit configured to generate, in accordance with the character image data received by the receiving unit and in a process separate from process performed by the first generating unit, second ink color data representing a multi-valued signal value corresponding to a color of ink to be used to form an image corresponding to the character image data on the recording medium;
- a correcting unit configured to correct signal values represented by the first and second ink color data generated by the first and second generating units; and
- a third generating unit configured to generate, in accordance with the first ink color data and the second ink color data of which the signal values have been corrected by the correcting unit, composed dot data representing existence of formation of dots to form an image of a first image attribute and an image of a character attribute,
- wherein, in a case where a same first color is to be printed for both the first image data and the character image data, the first generating unit generates the first ink color data and the second generating unit generates the second ink color data such that the color of ink to be ejected onto the recording medium as the first color is changed for both the first image data and the character image data.

* * * * *